United States Patent
Rambo et al.

(10) Patent No.: US 11,560,239 B2
(45) Date of Patent: Jan. 24, 2023

(54) REGENERATIVE THERMAL MANAGEMENT SYSTEM

(71) Applicant: General Electric Company, Schenectady, NY (US)

(72) Inventors: Jeffrey Douglas Rambo, Mason, OH (US); Brandon Wayne Miller, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 1 day.

(21) Appl. No.: 17/128,642

(22) Filed: Dec. 21, 2020

(65) Prior Publication Data

US 2022/0194622 A1    Jun. 23, 2022

(51) Int. Cl.
*B64D 37/34* (2006.01)
*F02C 7/224* (2006.01)
*F02C 7/14* (2006.01)

(52) U.S. Cl.
CPC ............... *B64D 37/34* (2013.01); *F02C 7/14* (2013.01); *F02C 7/224* (2013.01); *F05D 2260/205* (2013.01); *F05D 2260/213* (2013.01)

(58) Field of Classification Search
CPC . F02C 7/224; F02C 7/14; B64D 37/34; F05D 2260/205
See application file for complete search history.

(56) References Cited

U.S. PATENT DOCUMENTS

| | | | |
|---|---|---|---|
| 4,505,124 A | 3/1985 | Mayer | |
| 4,705,100 A | 11/1987 | Black et al. | |
| 4,714,139 A | 12/1987 | Lorenz et al. | |
| 4,776,536 A | 10/1988 | Hudson et al. | |
| 6,182,435 B1 | 2/2001 | Niggemann et al. | |
| 6,415,595 B1 | 7/2002 | Wilmot, Jr. et al. | |
| 7,055,505 B2 | 6/2006 | Washeleski et al. | |
| 7,260,926 B2 | 8/2007 | Sabatino et al. | |
| 7,984,606 B2 | 7/2011 | Smith | |
| 8,042,343 B2 | 10/2011 | Jarlestal | |
| 8,132,398 B2 | 3/2012 | Wang et al. | |
| 8,522,572 B2 | 9/2013 | Coffinberry et al. | |
| 8,677,755 B2 | 3/2014 | Bulin et al. | |

(Continued)

OTHER PUBLICATIONS

Co-pending U.S. Appl. No. 17/128,675, filed Dec. 21, 2020.
Co-pending U.S. Appl. No. 17/128,704, filed Dec. 21, 2020.

*Primary Examiner* — Gerald L Sung
*Assistant Examiner* — Alyson Joan Harrington
(74) *Attorney, Agent, or Firm* — Dority & Manning, P.A.

(57) ABSTRACT

Systems and methods of operating systems are provided. For example, a system comprises a fuel cooling loop including a cold fuel flowpath having a fuel flowing therethrough, a fuel cooler heat exchanger for cooling the fuel in fluid communication with the cold fuel flowpath, and a cold fuel tank disposed along the cold fuel flowpath for accumulating at least a portion of the cooled fuel. The system further comprises a fuel heating loop including a hot fuel flowpath for a flow of the fuel, a fuel heater heat exchanger for heating the fuel in fluid communication with the hot fuel flowpath, and a hot fuel tank disposed along the hot fuel flowpath for accumulating at least a portion of the heated fuel. The fuel cooling loop is coupled to the fuel heating loop such that the fuel circulates through both the fuel cooling loop and the fuel heating loop.

22 Claims, 9 Drawing Sheets

(56) References Cited

U.S. PATENT DOCUMENTS

| | | |
|---|---|---|
| 9,074,562 B2 | 7/2015 | Tsutsumi et al. |
| 9,151,180 B2 | 10/2015 | Veilleux, Jr. |
| 9,334,802 B2 | 5/2016 | Papa et al. |
| 9,561,857 B2 | 2/2017 | Weber |
| 9,604,730 B2 | 3/2017 | Hagh et al. |
| 9,687,773 B2 | 6/2017 | Johnson et al. |
| 9,823,030 B2 | 11/2017 | Veilleux, Jr. |
| 10,086,222 B2 | 10/2018 | Tichborne et al. |
| 10,352,241 B2 | 7/2019 | Snape et al. |
| 10,526,971 B2 | 1/2020 | Mastrocola et al. |
| 2007/0101731 A1 | 5/2007 | Bayt et al. |
| 2012/0000205 A1* | 1/2012 | Coffinberry ............ B64D 13/06 60/806 |
| 2012/0297780 A1 | 11/2012 | Bruno et al. |
| 2012/0297789 A1 | 11/2012 | Coffinberry |
| 2013/0086909 A1 | 4/2013 | Wang et al. |
| 2015/0314229 A1* | 11/2015 | Johnson ............. B01D 19/0026 422/187 |
| 2016/0280387 A1 | 9/2016 | Snape et al. |
| 2017/0058774 A1 | 3/2017 | Pickford |
| 2017/0167307 A1 | 6/2017 | Scipio et al. |
| 2018/0155046 A1 | 6/2018 | Bowman et al. |
| 2020/0191057 A1 | 6/2020 | Cocks |
| 2020/0332714 A1 | 10/2020 | Ribarov |
| 2020/0332716 A1 | 10/2020 | Ribarov |

\* cited by examiner

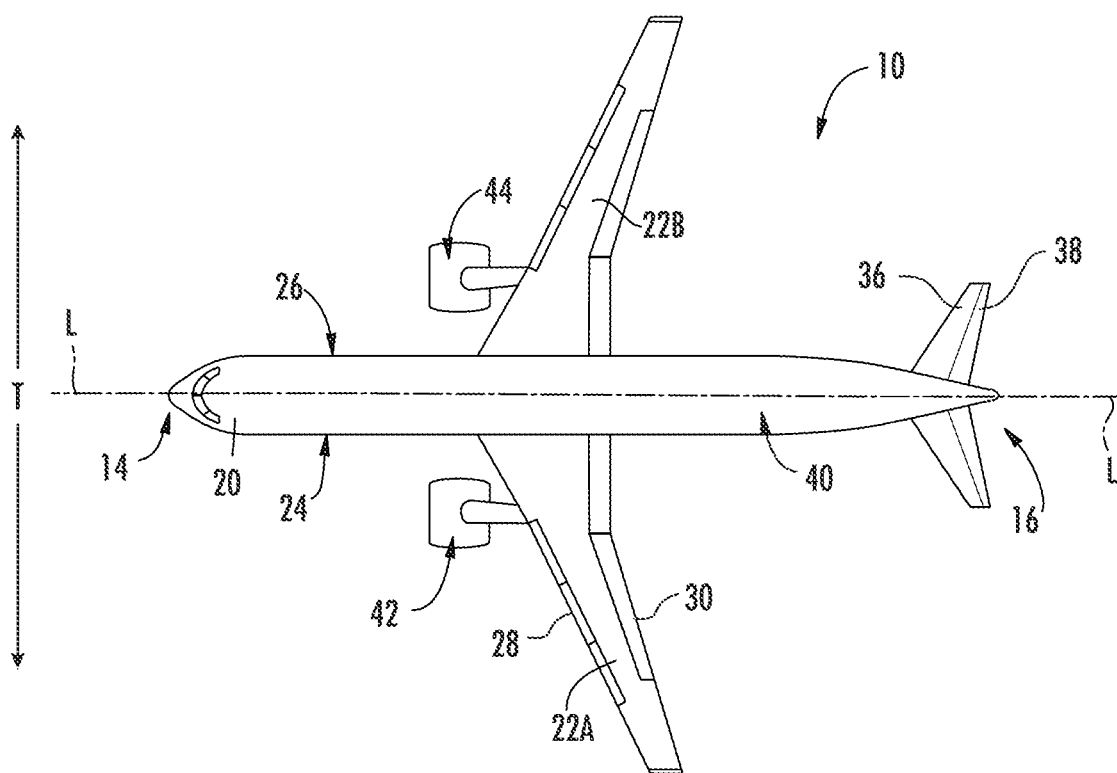
FIG. - 1A -
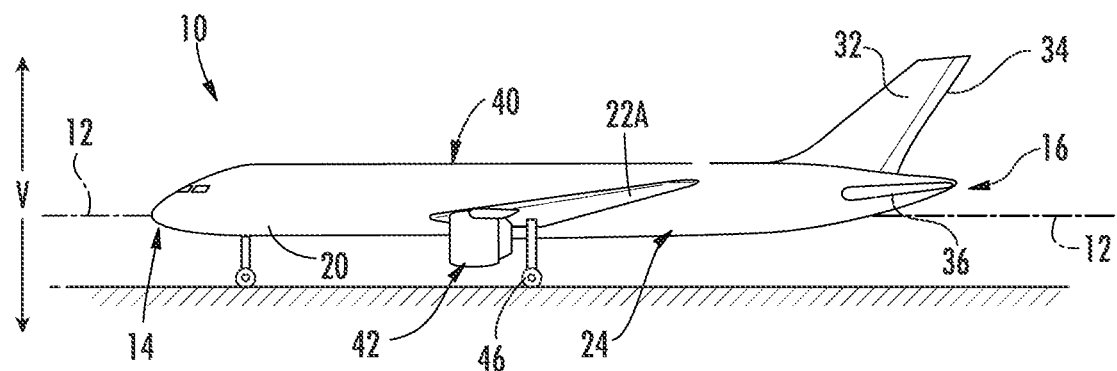
FIG. - 1B -

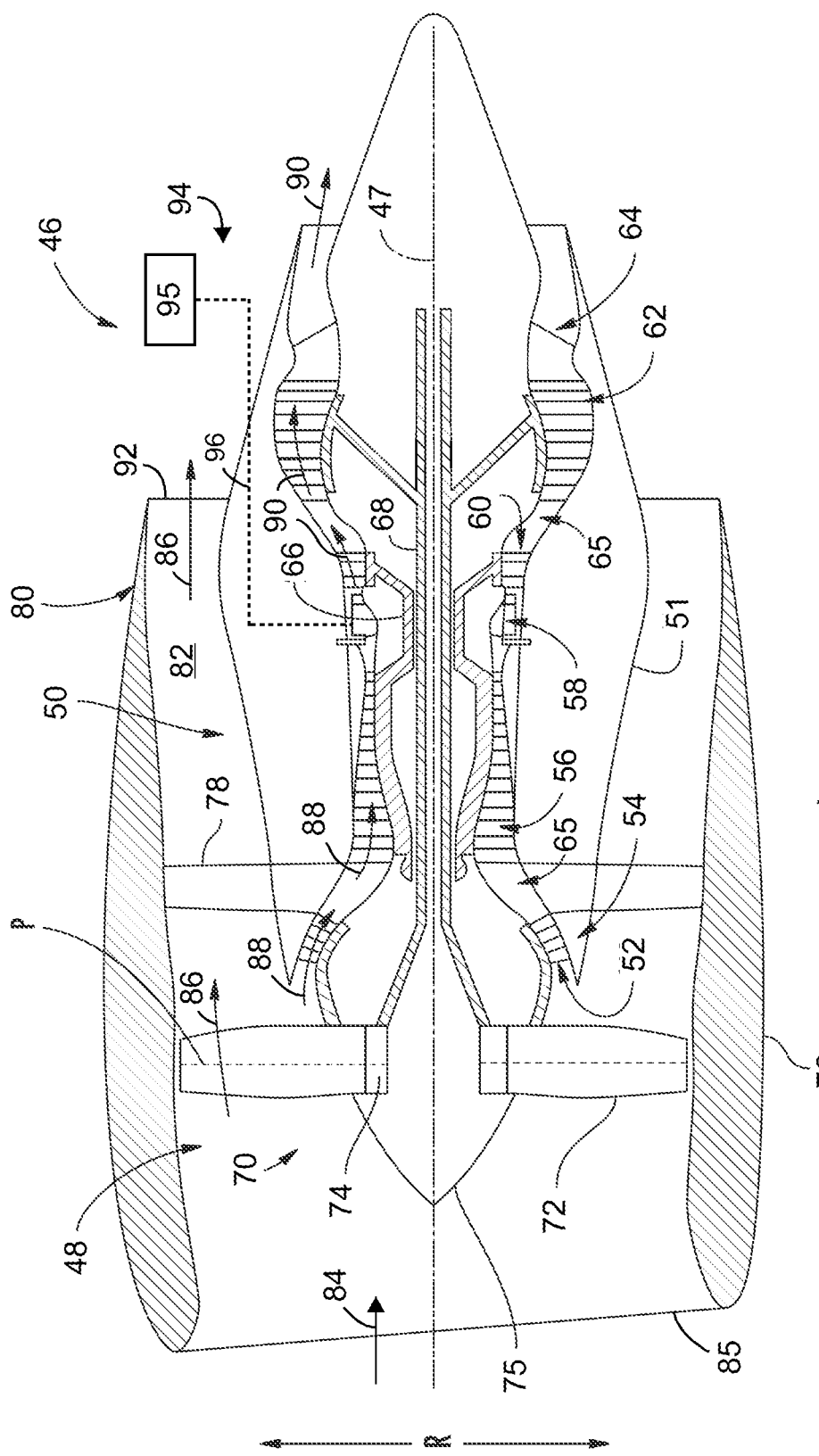
FIG. -1C-

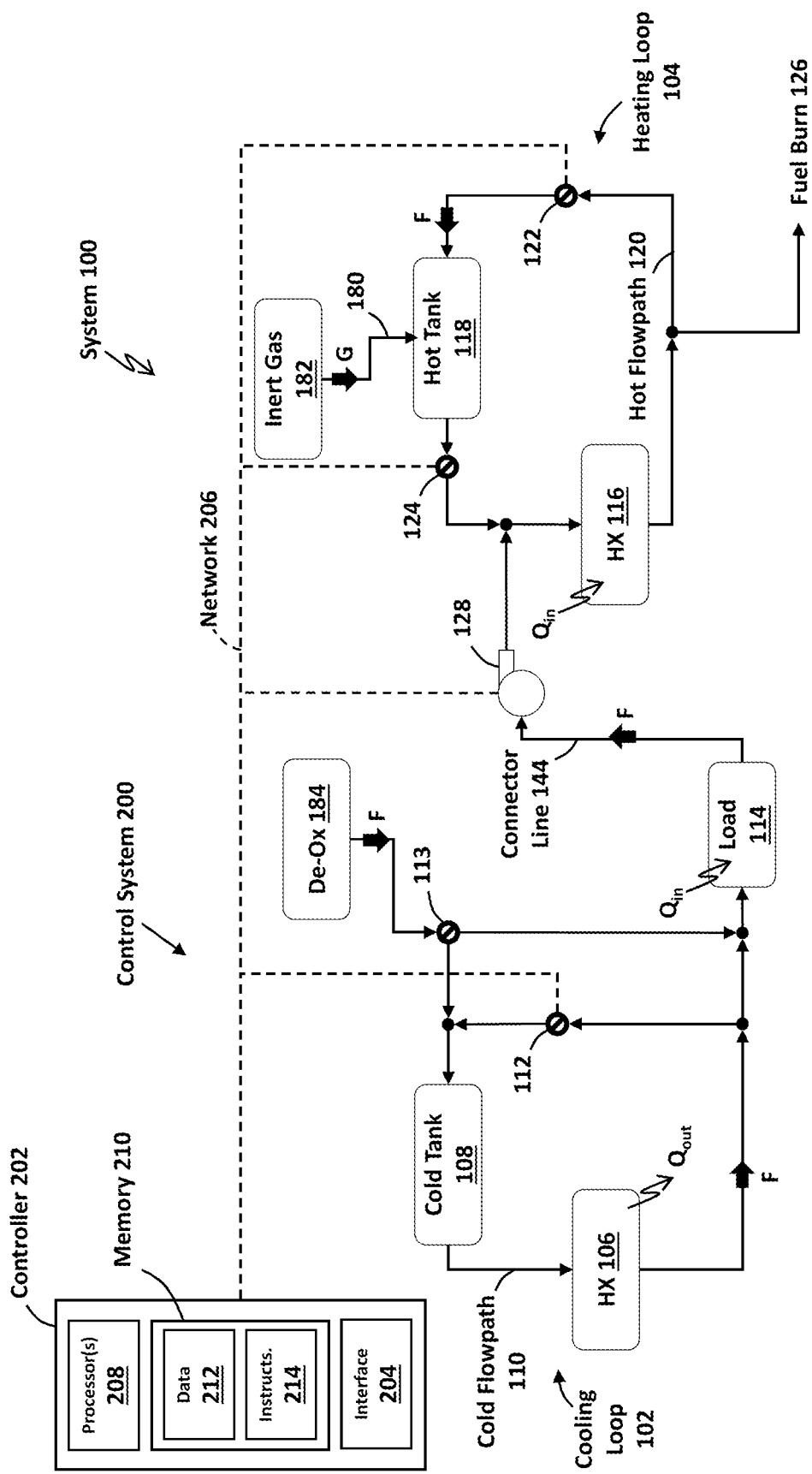
FIG. – 2 –

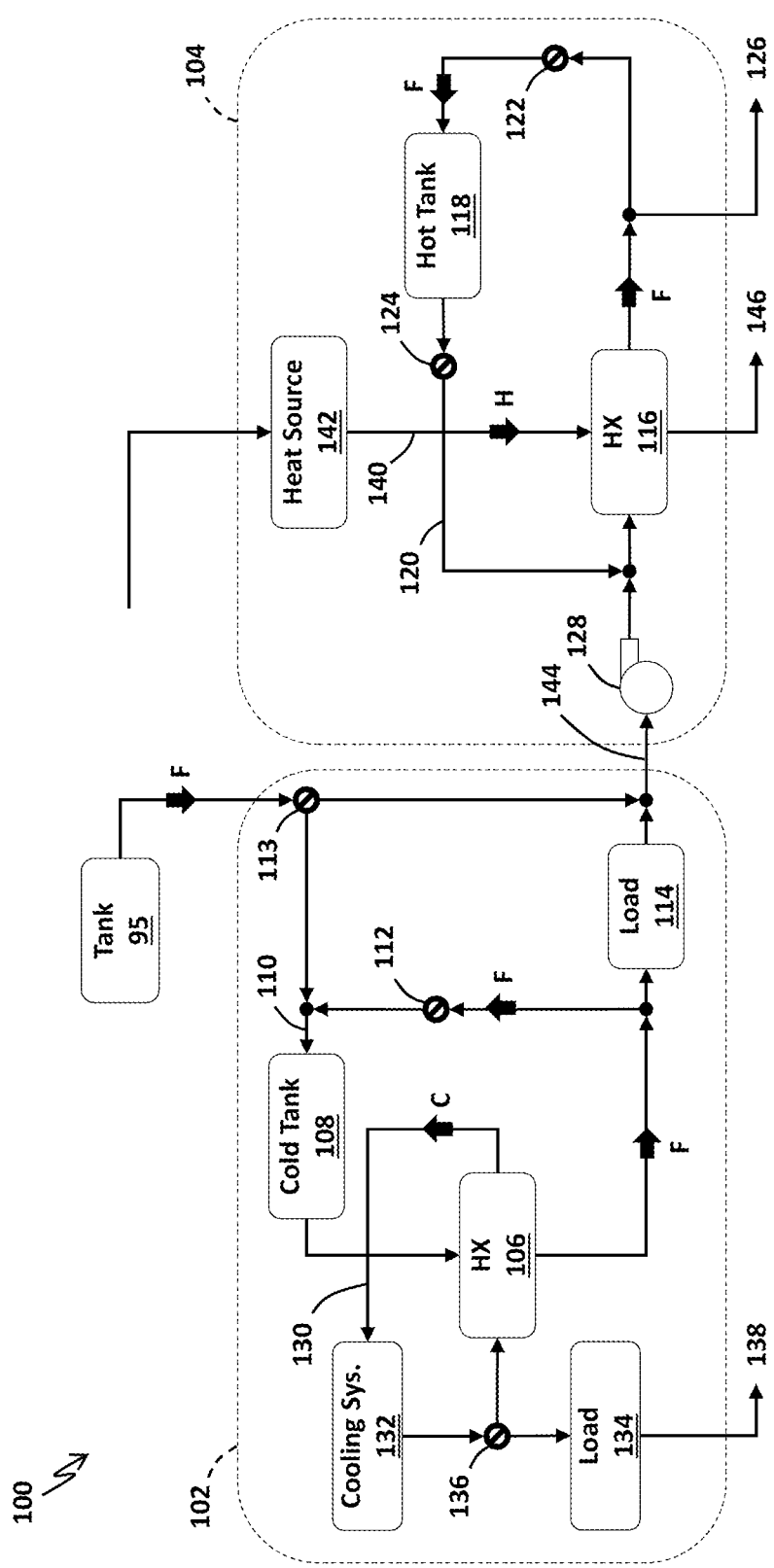
FIG. - 3 -

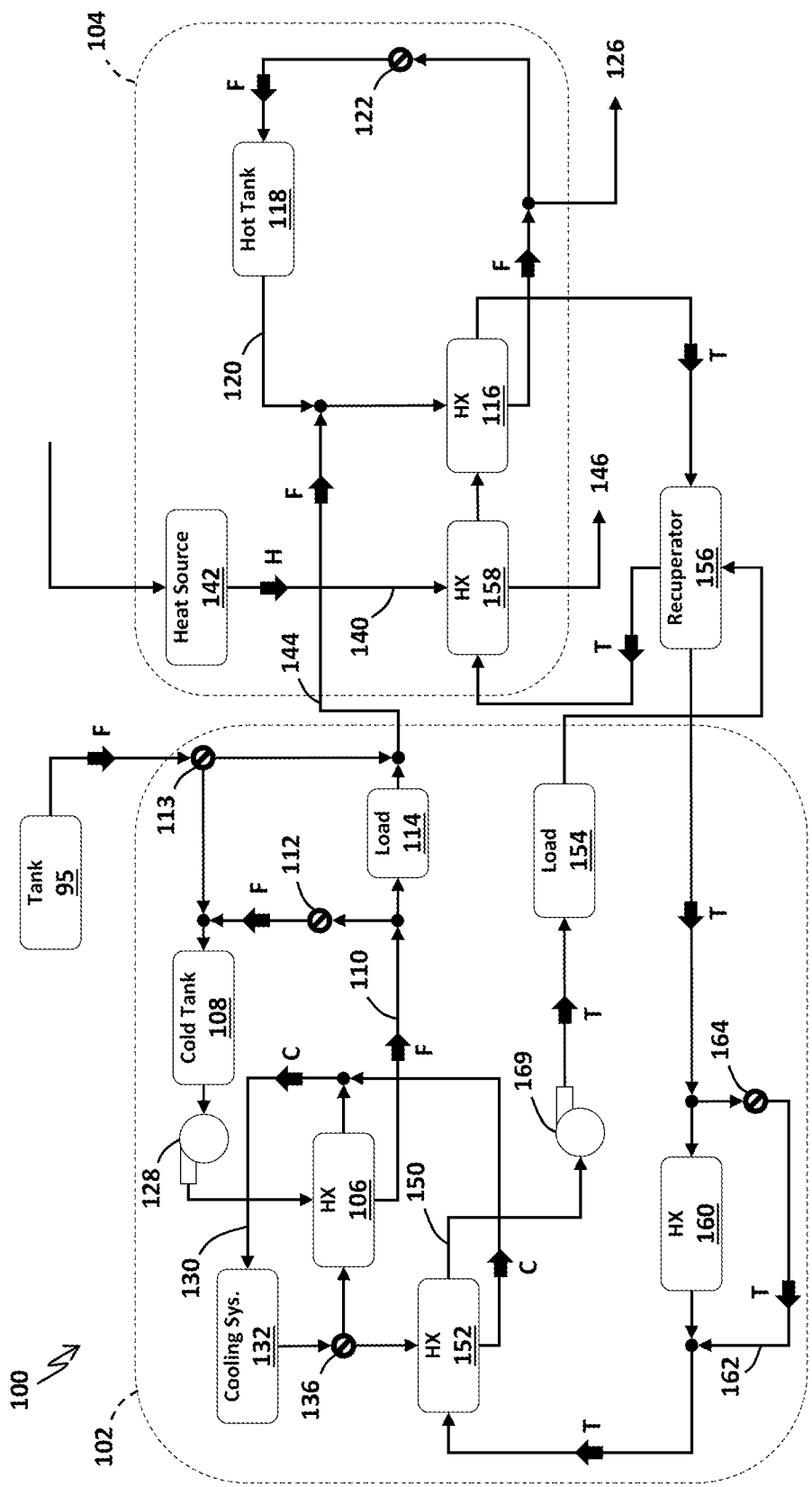
FIG. -4-

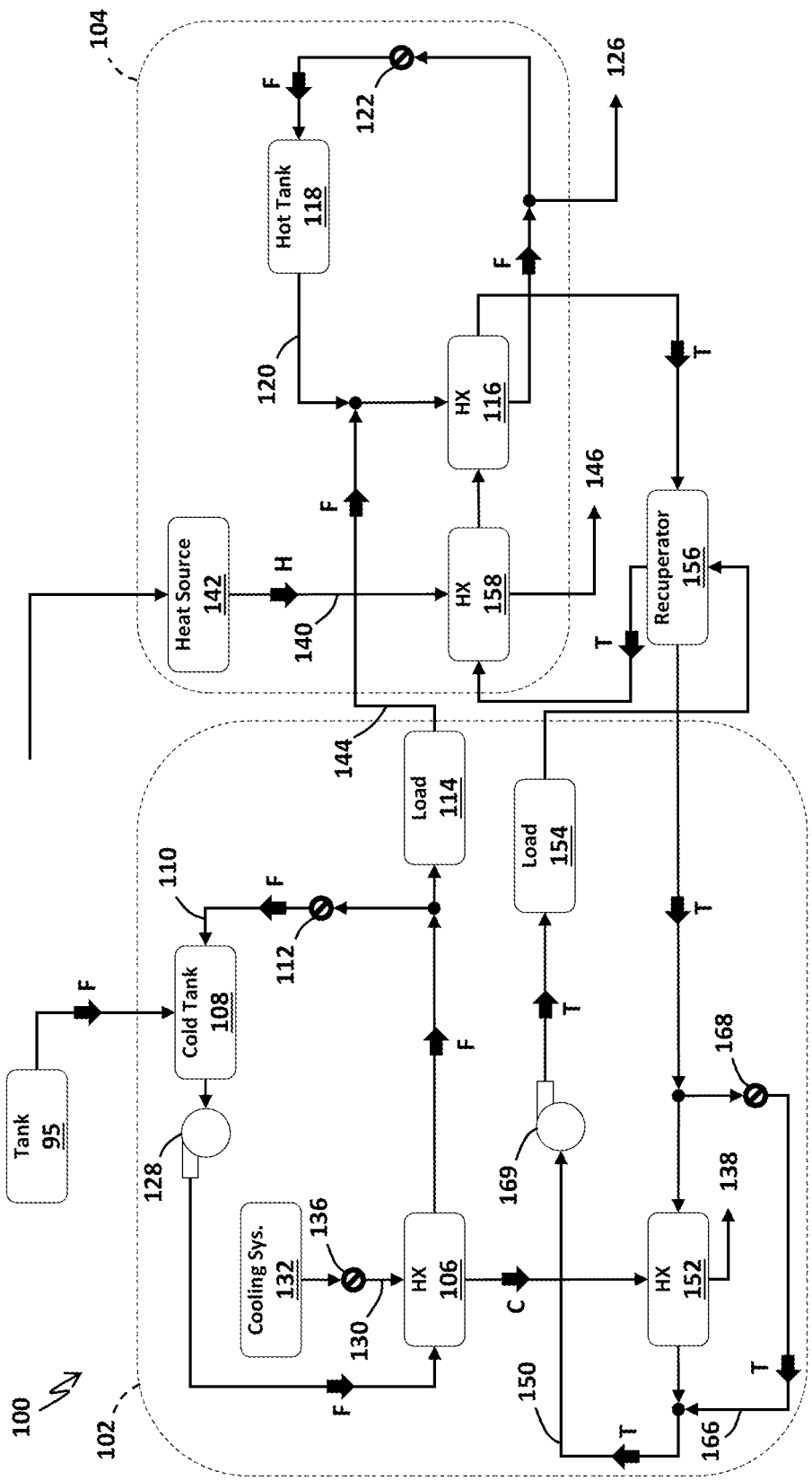
FIG. -5-

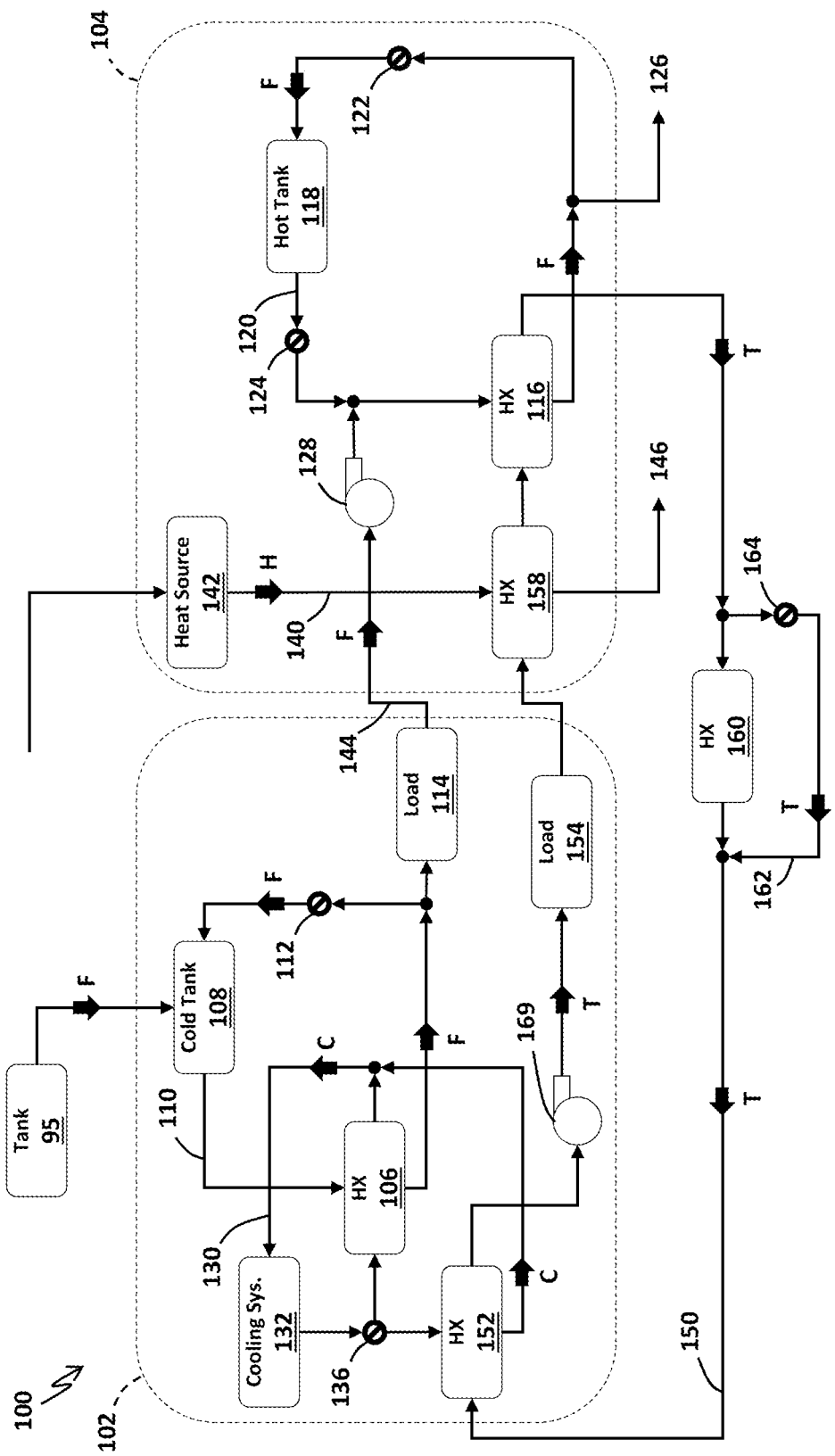
FIG. – 6 –

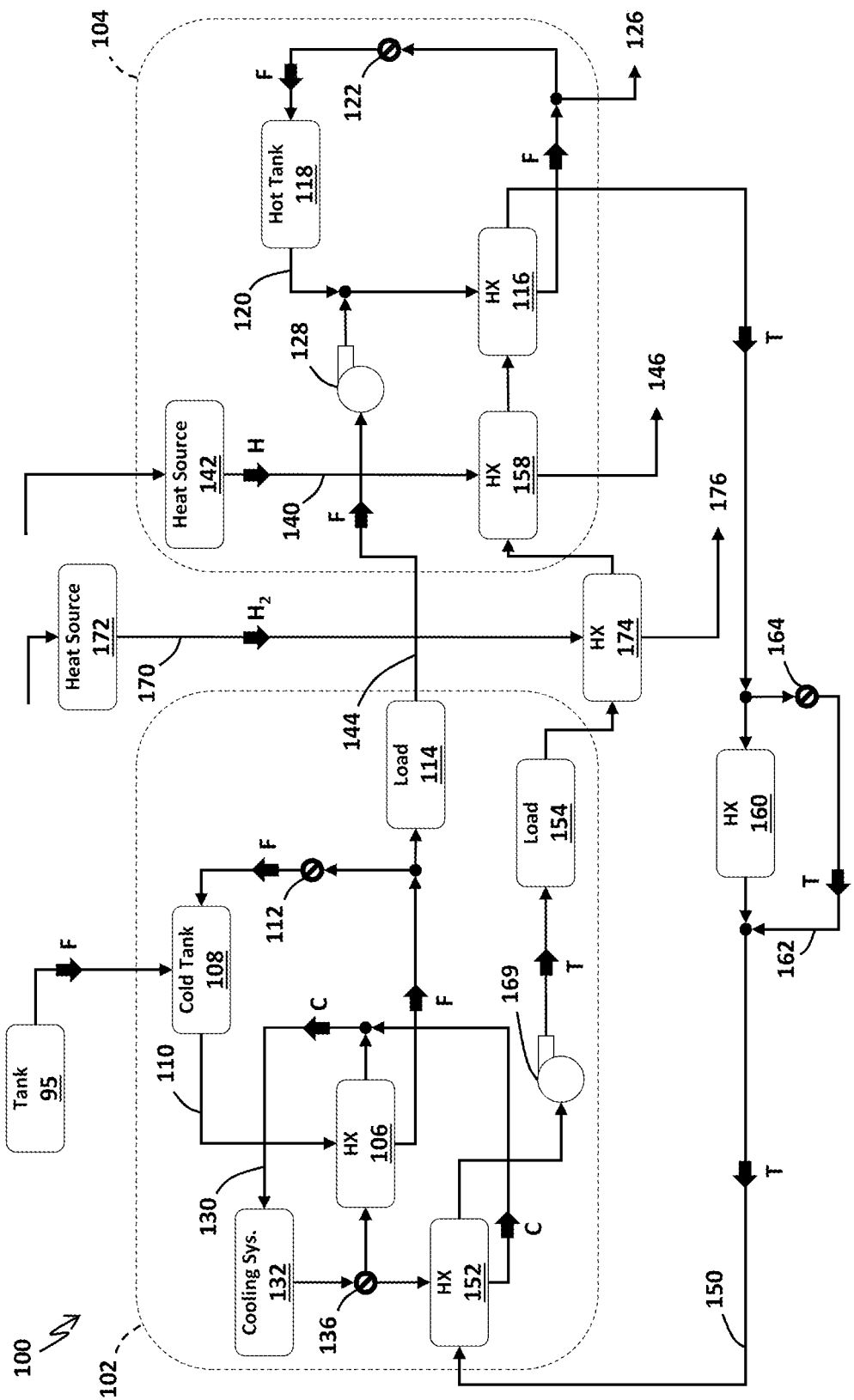
FIG. —7A—

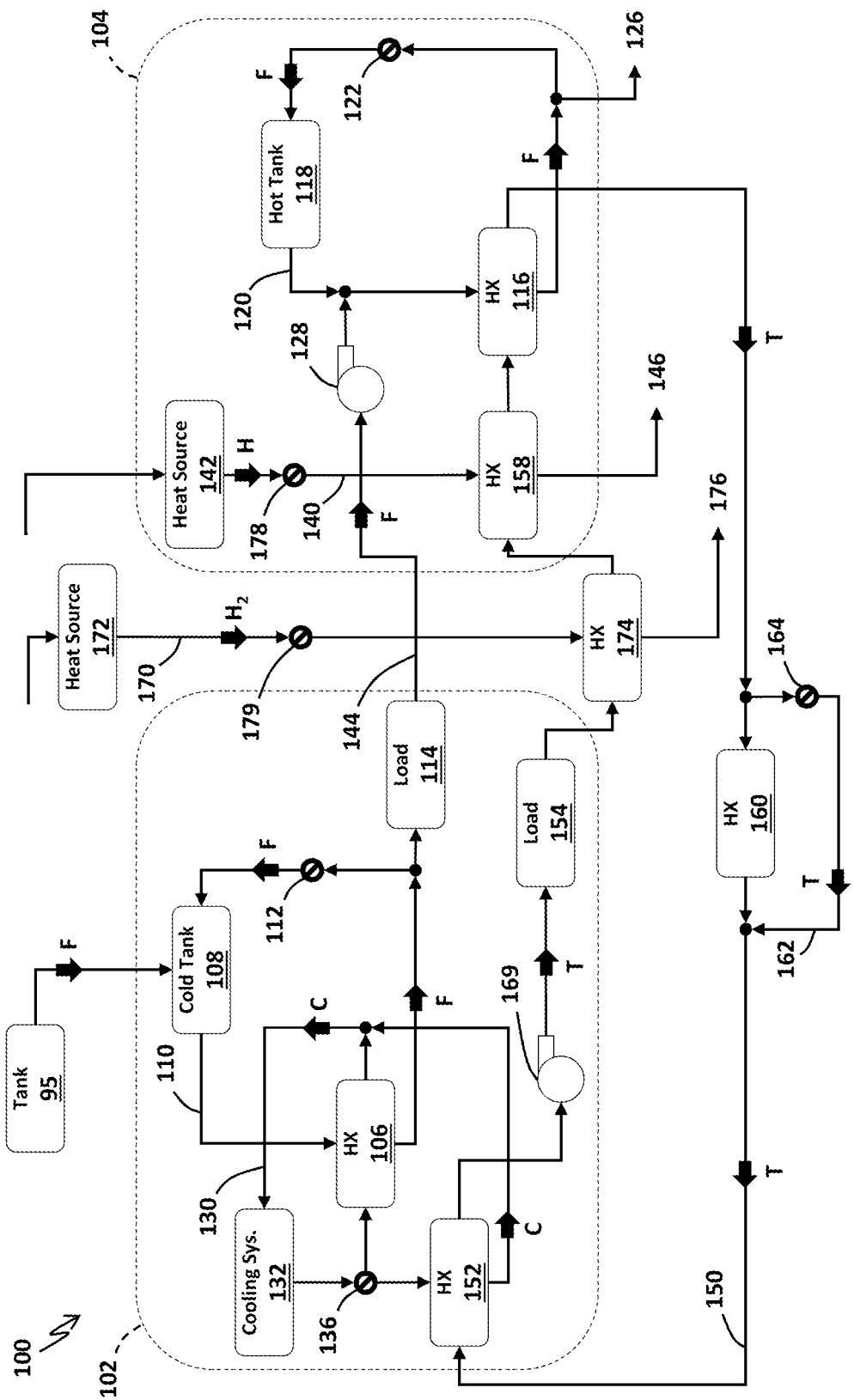
FIG. -7B-

REGENERATIVE THERMAL MANAGEMENT SYSTEM

FIELD

The present subject matter relates generally to power and/or thermal management systems and, more particularly, to thermal management systems utilizing a fuel of an engine and/or vehicle for regenerative cooling capacity and regenerative fuel heating.

BACKGROUND

Vehicles such as aircraft, as well as engines such as gas turbine engines that may be used, e.g., for power generation for such vehicles or for other applications, typically have one or more systems that generate heat. Usually, thermal management systems (TMS) are provided for managing heat generation of the vehicle and/or engine. For example, a cooling system may be used to cool one or more heat loads. Moreover, heat generated by the vehicle and/or engine, or one or more systems of such vehicle and/or engine, may be used to heat fuel consumed by the vehicle and/or engine, as burning a higher temperature fuel can provide, e.g., greater propulsion efficiency for an aircraft.

However, thermal management systems often have a mismatch between capacity and demand. For example, thermal management systems often generate cooling capacity during periods of low cooling demand (i.e., when heat generation is low) and may not generate sufficient cooling capacity during periods of high cooling demand. Thus, excess cooling capacity typically is lost and is not available when increased cooling capacity is needed. As another example, more fuel heating capacity may be generated during certain operating conditions or modes, such as aircraft takeoff, than is needed during those operating conditions, while less fuel heating capacity is generated during operating conditions having a higher or greater demand for heated fuel.

Accordingly, improvements to vehicles such as aircraft, engines (including engines for vehicles), and thermal management systems that help overcome these issues and/or take advantage of potential opportunities, such as the thermal capacity of engine and/or vehicle fuel, would be useful.

BRIEF DESCRIPTION

Aspects and advantages of the invention will be set forth in part in the following description, or may be obvious from the description, or may be learned through practice of the invention.

In one exemplary embodiment of the present subject matter, a system is provided. The system comprises a fuel cooling loop including a cold fuel flowpath having a fuel flowing therethrough, a fuel cooler heat exchanger for cooling the fuel that is in fluid communication with the cold fuel flowpath, and a cold fuel tank disposed along the cold fuel flowpath for accumulating at least a portion of the cooled fuel. The system further comprises a fuel heating loop including a hot fuel flowpath for a flow of the fuel, a fuel heater heat exchanger for heating the fuel that is in fluid communication with the hot fuel flowpath, and a hot fuel tank disposed along the hot fuel flowpath for accumulating at least a portion of the heated fuel. The fuel cooling loop is coupled to the fuel heating loop such that the fuel circulates through both the fuel cooling loop and the fuel heating loop.

In another exemplary embodiment of the present subject matter, a method of operating a system is provided. The method comprises selectively operating a fuel cooling loop in thermal communication with a cooling system to cool a fuel flowing through the fuel cooling loop and to accumulate the cooled fuel in a cold fuel tank; selectively operating the fuel cooling loop to cool a fuel-cooled thermal load with the cooled fuel and flow the fuel to a fuel heating loop; selectively operating the fuel heating loop in thermal communication with a heat source to heat the fuel flowing through the fuel heating loop and to accumulate the heated fuel in a hot fuel tank; and selectively operating the fuel heating loop to flow at least a portion of the fuel to a fuel burn location for consumption of the fuel and to recirculate a remaining portion of the fuel through the fuel heating loop.

In yet another exemplary embodiment of the present subject matter, a system is provided. The system comprises a cold fuel tank for accumulating a fuel, a hot fuel tank for accumulating the fuel at a temperature greater than a temperature of the fuel in the cold fuel tank, and a thermal transport flowpath in thermal communication with both the cold fuel tank and the hot fuel tank. The fuel flows along a flowpath to fluidly connect the cold fuel tank and the hot fuel tank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1A is a top view of an aircraft vehicle in accordance with an exemplary embodiment of the present subject matter.

FIG. 1B is a side view of the exemplary aircraft vehicle of FIG. 1A.

FIG. 1C is a schematic, cross-sectional view of a gas turbine engine in accordance with an exemplary embodiment of the present subject matter.

FIGS. 2-7B are flow diagrams of a thermal management system in accordance with various exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides a system for simultaneously recirculating both cold fuel and hot fuel, where the cold fuel may be used, e.g., for thermal management system capacity, and the hot fuel may be used, e.g., to improve propulsive efficiency. An exemplary system includes a fuel cooling loop in which a fuel is recirculated, and a fuel heating loop in which the fuel is recirculated, with the fuel coupling the fuel cooling and fuel heating loops and the temperature of the fuel varying between each of the fuel cooling and fuel heating loops. The fuel cooling loop includes a cold fuel tank for accumulating cooled fuel and the fuel heating loop includes a hot fuel tank for accumulating heated fuel. As such, the benefits of cooled fuel and the benefits of heated fuel may be realized during periods or modes of operation, e.g., of a vehicle and/or engine utilizing the fuel, in which the capacity to cool and/or heat the fuel is diminished, reduced, or nonexistent. A thermal transport bus for facilitating thermal energy transfer with the fuel may be disposed in both the fuel cooling loop and the fuel heating loop such that the bus is common to both loops.

Referring now to the drawings, wherein identical numerals indicate the same elements throughout the figures, FIG. 1A provides a top view of an exemplary aircraft vehicle 10 as may incorporate various embodiments of the present subject matter. FIG. 1B provides a port side 24 view of the aircraft 10 as illustrated in FIG. 1A. As shown in FIGS. 1A and 1B collectively, the aircraft 10 defines a longitudinal direction L that extends therethrough, a vertical direction V, a transverse direction $T_V$, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction $T_V$ with respect to the longitudinal direction L, from the port side 24 of the fuselage 20. Further, the second wing 22B similarly extends outwardly from the fuselage 20, generally along the transverse direction $T_V$ with respect to the longitudinal direction L, from a starboard side 26 of the fuselage 20. Each of the wings 22A, 22B for the exemplary embodiment depicted includes one or more leading edge flaps 28 and one or more trailing edge flaps 30.

Referring still to the exemplary aircraft 10 of FIGS. 1A and 1B, the aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40. However, it should be appreciated that in other exemplary embodiments of the present disclosure, the aircraft 10 may additionally or alternatively include any other suitable configuration of stabilizers that may or may not extend directly along the vertical direction V or horizontal/transverse direction $T_V$. In addition, alternative stabilizers may be any suitable shape, size, configuration, or orientation while remaining within the scope of the present subject matter.

The exemplary aircraft 10 of FIGS. 1A and 1B also includes a propulsion system. The exemplary propulsion system depicted includes a plurality of aircraft engines, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines (see, e.g., FIG. 1C) suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may be configured as turbojet engines, turboshaft engines, turboprop engines, etc. Further, in still other exemplary embodiments, the propulsion system may include one or more electric, or hybrid-electric, aircraft engines (e.g., electric fans).

Referring now to FIG. 1C, a schematic cross-sectional view is provided of a gas turbine engine in accordance with an exemplary embodiment of the present disclosure. More particularly, for the embodiment of FIG. 1C, the gas turbine engine is a high-bypass turbofan jet engine 46, referred to herein as "turbofan engine 46" or "engine 46." Notably, in at least certain embodiments, the aircraft engines 42, 44 of FIGS. 1A and 1B may be configured in substantially the same manner as exemplary turbofan engine 46 depicted in FIG. 1C, discussed below.

As shown in FIG. 1C, the turbofan engine 46 defines an axial direction A (extending parallel to a longitudinal centerline 47 provided for reference), a radial direction R, and a circumferential direction (extending about the axial direction A; not depicted in FIG. 1C). In general, the turbofan engine 46 includes a fan section 48 and a turbomachine 50 disposed downstream from the fan section 48.

The exemplary turbomachine 50 depicted generally includes a substantially tubular outer casing 51 that defines an annular inlet 52. The outer casing 51 encases, in serial flow relationship, a compressor section including a booster or low pressure (LP) compressor 54 and a high pressure (HP) compressor 56; a combustion section 58; a turbine section including a high pressure (HP) turbine 60 and a low pressure (LP) turbine 62; and a jet exhaust nozzle section 64. The compressor section, combustion section 58, and turbine section together define at least in part a core air flowpath 65 extending from the annular inlet 52 to the jet nozzle exhaust section 64. The turbofan engine 46 further includes one or more drive shafts. More specifically, the turbofan engine 46 includes a high pressure (HP) shaft or spool 66 drivingly connecting the HP turbine 60 to the HP compressor 56, and a low pressure (LP) shaft or spool 68 drivingly connecting the LP turbine 62 to the LP compressor 54.

For the depicted embodiment, fan section 48 includes a fan 70 having a plurality of fan blades 72 coupled to a disk 74 in a spaced apart manner. As depicted, the fan blades 72 extend outward from the disk 74 generally along the radial direction R. The fan blades 72 and disk 74 are together rotatable about the longitudinal axis 47 by LP shaft 68. In some embodiments, a power gear box having a plurality of gears may be included for stepping down the rotational speed of the LP shaft 68 to a more efficient rotational fan speed.

Referring still to the exemplary embodiment of FIG. 1C, the disk 74 is covered by rotatable front hub or nacelle 75 aerodynamically contoured to promote an airflow through the plurality of fan blades 72. Additionally, the exemplary fan section 48 includes an annular fan casing or outer nacelle 76 that circumferentially surrounds the fan 70 and/or at least a portion of the turbomachine 50. It should be appreciated that nacelle 75 may be configured to be supported relative to the turbomachine 50 by a plurality of circumferentially-spaced outlet guide vanes 78. Moreover, a downstream section 80 of the nacelle 76 may extend over an outer portion of the turbomachine 50 so as to define a bypass airflow passage 82 therebetween.

During operation of the turbofan engine 46, a volume of air 84 enters turbofan engine 46 through an associated inlet 85 of the nacelle 76 and/or fan section 48. As the volume of air 84 passes across fan blades 76, a first portion of the air 84 as indicated by arrows 86 is directed or routed into the bypass airflow passage 82 and a second portion of the air 84 as indicated by arrows 88 is directed or routed into the LP compressor 54. The ratio between the first portion of air 86 and the second portion of air 88 is commonly known as a bypass ratio. The pressure of the second portion of air 88 is then increased as it is routed through the high pressure (HP) compressor 56 and into the combustion section 58, where it is mixed with fuel and burned to provide combustion gases 90.

The combustion gases 90 are routed through the HP turbine 60 where a portion of thermal and/or kinetic energy from the combustion gases 90 is extracted via sequential stages of HP turbine stator vanes that are coupled to the outer casing 51 and HP turbine rotor blades that are coupled to the HP shaft or spool 66, thus causing the HP shaft or spool 66 to rotate, thereby supporting operation of the HP compressor 56. The combustion gases 90 are then routed through the LP turbine 62 where a second portion of thermal and kinetic energy is extracted from the combustion gases 90 via sequential stages of LP turbine stator vanes that are coupled to the outer casing 51 and LP turbine rotor blades that are coupled to the LP shaft or spool 68, thus causing the LP shaft or spool 68 to rotate, thereby supporting operation of the LP compressor 54 and/or rotation of the fan 70.

The combustion gases 90 are subsequently routed through the jet exhaust nozzle section 64 of the turbomachine 50 to provide propulsive thrust. Simultaneously, the pressure of the first portion of air 86 is substantially increased as the first portion of air 86 is routed through the bypass airflow passage 82 before it is exhausted from a fan nozzle exhaust section 92 of the turbofan engine 46, also providing propulsive thrust. The HP turbine 60, the LP turbine 62, and the jet exhaust nozzle section 64 at least partially define the core air flowpath 65 for routing the combustion gases 90 through the turbomachine 50.

As described above, the second portion of air 88 is mixed with fuel in the combustion section 58 to produce combustion gases 90. As shown schematically in FIG. 1C, the engine 46 may include a fuel delivery system 94 for providing fuel to the combustion section 58 of the engine 46. The fuel delivery system 94 may include a fuel tank 95 and one or more fuel delivery lines 96, which may form a fuel flowpath from the fuel source (fuel tank 95) to the combustion section 58. In other embodiments, however, that the fuel delivery system 94 may be considered part of a vehicle, such as aircraft 10, in which the engine 46 is installed, rather than as part of the engine 46. Further, it will be understood that, although not described herein, the exemplary aircraft 10 may include a fuel delivery system, such as fuel delivery system 94, for providing fuel to the engines 42, 44, which may or may not be configured as described with respect to engine 46.

It will be appreciated that the exemplary turbofan engine 46 depicted in FIG. 1C is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Moreover, although the exemplary gas turbine engine depicted in FIG. 1C is shown schematically as a direct drive, fixed-pitch turbofan engine 46, in other embodiments, a gas turbine engine of the present disclosure may be a geared gas turbine engine (i.e., including a gearbox between the fan 70 and shaft driving the fan, such as the LP shaft 68), may be a variable pitch gas turbine engine (i.e., including a fan 70 having a plurality of fan blades 72 rotatable about their respective pitch axes P), a mixed-flow turbofan, a turbojet, an un-ducted fan architecture, etc. Further, although not depicted herein, in other embodiments the gas turbine engine may be any other suitable type of gas turbine engine, such as an industrial gas turbine engine incorporated into a power generation system, a marine gas turbine engine, etc. Further still, in alternative embodiments, aspects of the present disclosure may be incorporated into, or otherwise utilized with, any other type of engine, such as reciprocating engines.

Turning now to FIGS. 2 through 7B, the present subject matter also provides a TMS, such as may be used with the engine 46. More particularly, the thermal management system 100 (TMS 100 or system 100) may manage thermal transients of one or more systems and/or apparatus of the engine 46 and/or a vehicle 10 in which the engine 46 is installed. For example, to manage thermal transients, the TMS 100 may be used to cool one or more thermal loads of the engine 46 or a vehicle 10 including the engine 46. As another example, to improve propulsive efficiency, the TMS 100 may be used to heat fuel and store the heated fuel for use during certain operational modes by the engine 46 or a vehicle 10 including the engine 46.

More particularly, in the embodiments described and illustrated herein, the TMS 100 both cools and stores cooled fuel and heats and stores heated fuel. Referring specifically to FIG. 2, the TMS 100 includes a fuel cooling loop 102 and a fuel heating loop 104, with a fuel F circulating through the fuel cooling loop 102 and the fuel heating loop 104. That is, the fuel cooling loop 102 is coupled to the fuel heating loop 104 such that the fuel F circulates through both the fuel cooling loop 102 and the fuel heating loop 104 as described herein.

The fuel cooling loop 102 includes a coolant-fuel heat exchanger 106 and a cold fuel tank 108 disposed along a cold fuel flowpath 110, through which the fuel F flows. The coolant-fuel heat exchanger 106 also may be referred to as fuel cooler heat exchanger 106, or simply fuel cooler 106. The fuel cooling loop further includes a cold fuel recirculation valve 112, which may be used to modulate the flow of the fuel F to the cold fuel tank 108. More particularly, the cold fuel recirculation valve 112 may be used to modulate the flow of the fuel F between the cold fuel tank 108 and the fuel heating loop 104. For instance, the cold fuel recirculation valve 112 may be a flow diverter or a modulating valve that can control a flow split between the cold fuel tank 108 (which may be referred to as fuel flow $F_{Ctank}$) and the fuel heating loop 114 (which may be referred to as fuel flow $F_{cool}$), and the cold fuel recirculation valve 112 may be fluidly connected to the fuel cooling loop 102 upstream of the cold fuel tank 108 for controlling a flow of the fuel $F_{Ctank}$ to the cold fuel tank 108 and/or a flow of the fuel $F_{cool}$ to the fuel heating loop 104. The fuel cooling loop 102 also includes one or more fuel-cooled thermal loads 114. That is, in the exemplary embodiment of FIG. 2, the fuel F (i.e., a mass flow of fuel) is used to cool a thermal load 114 before flowing to the fuel heating loop 104, which is downstream of the fuel-cooled thermal load 114.

The fuel heating loop 104 of the exemplary embodiment of FIG. 2 includes a fuel heater heat exchanger 116 and a hot fuel tank 118 disposed along a hot fuel flowpath 120, through which the fuel F flows. The fuel heating loop 104 further includes a hot fuel recirculation valve 122, which may be used to modulate the flow of the fuel F to the hot fuel tank 118 (which may be referred to as fuel flow $F_{Htank}$). The fuel heating loop 104 also may include a fuel heater valve 124, which can be used to modulate the flow of the fuel F between accumulation in the hot fuel tank 118 and heating in the fuel heater heat exchanger 116, as described in greater detail below. From the fuel heating loop 104, the fuel F may flow to a fuel burn location 126 (which may be referred to as a fuel flow $F_{burn}$). The fuel burn location 126 may be, e.g., a combustor or combustion section of an engine, such as the combustion section 58 of the engine 46, and in such embodiments, the fuel flow to the fuel burn location 126 may be referred to as an engine burn flow. In other embodiments, the fuel burn location 126 may be one or more fuel-driven actuators on the engine 46 and/or vehicle 10, one or more fuel recirculation loops, and/or an afterburner or augmentor.

Accordingly, as shown in FIG. 2, the hot fuel recirculation valve 122 may control the flow of the fuel F between the hot fuel tank 118 and the fuel burn location 126. Like the cold fuel recirculation valve 112, the hot fuel recirculation valve 122 may be a flow diverter or a modulating valve that can control a flow split between the hot fuel tank 118 and the fuel burn location, i.e., the hot fuel recirculation valve 122 may be positioned in the fuel heating loop 104 to control the amount of fuel F that flows to the hot fuel tank 118 and/or the fuel burn location 126. More particularly, the hot fuel recirculation valve 122 may be fluidly connected to the fuel heating loop 104 upstream of the hot fuel tank 118 for controlling a flow of the fuel F to the hot fuel tank 118 and/or to the fuel burn location 126. Similarly, the fuel heater valve 124 may be a flow diverter or a modulating valve that can control a flow split between the hot fuel tank 118 and the fuel heater 116, i.e., the fuel heater valve 124 may be fluidly connected to the fuel heating loop 104 downstream of the hot fuel tank 118 and upstream of the fuel heater 116 for controlling a flow of the fuel F to the fuel heater 116 from the hot fuel tank 118.

As further illustrated in FIG. 2, the TMS 100 may include a fuel pump 128 to drive the fuel F along the fuel cooling loop 102 and the fuel heating loop 104. The fuel pump 128, as well as any other pump included in the system 100, may have any suitable configuration. For example, the fuel pump 128 may be powered by an electrical input, may be a turbopump (comprising a turbine and a pump), etc.

As described herein, the fuel pump 128 may be disposed in either the fuel cooling loop 102 or the fuel heating loop 104, and in some embodiments, more than one fuel pump 128 may be included to ensure the fuel F flows along the cold fuel flowpath 110 and the hot fuel flowpath 120 at an appropriate or desired flow rate. In exemplary embodiments, the fuel pump 128 may be disposed downstream of the cold fuel flowpath 110, e.g., along the hot fuel flowpath 120 in the fuel heating loop 104, to optimize the thermal contribution of the fuel pump 128. That is, the fuel pump 128 may heat the fuel F as the fuel flows therethrough; therefore, the fuel pump 128 may be located downstream of the fuel cooling loop 102, e.g., in the fuel heating loop 104 where the fuel F is being heated, to avoid or eliminate any heat addition by the fuel pump 128 in the fuel cooling loop 102, where the fuel F is being cooled.

FIG. 2 also illustrates the transfer of heat to and from the fuel F in the exemplary fuel cooling and fuel heating loops 102, 104. More particularly, heat is removed from the fuel F via heat exchange in the fuel cooler heat exchanger 106, as represented by the arrow $Q_{out}$ at the heat exchanger block 106 in FIG. 2. Heat is added to the fuel F via heat exchange with the fuel-cooled thermal load(s) 114 and in the fuel heater heat exchanger 116, as represented by the arrows $Q_{in}$ at the thermal load block 114 and the fuel heater heat exchanger block 116. It will be appreciated that the fuel cooling loop 102 and the fuel heating loop 104 may use any potential source of thermal energy transfer to remove heat from or add heat to the fuel F; some examples of thermal energy sources include engine bleed air, one or more mechanical systems, etc.

As described in greater detail herein, each of the cold fuel tank 108 and hot fuel tank 118 may function as an accumulator such that the fuel F cooled through the removal of heat $Q_{out}$ and heated through the addition of heat $Q_{in}$ may be accumulated or stored in the respective fuel tank 108, 118 for later use. For instance, spare cooling capacity generated by a cooling system may be accumulated in the fuel F stored in the cold fuel tank 108 for use in response to an increased cooling demand. More particularly, the cooling demand, e.g., of the fuel-cooled load(s) 114, may not correspond to the cooling capacity generated by the cooling system at a given time, but where the cooling demand is greater than the cooling capacity, the excess demand may be met by supplying accumulated cooled or cold fuel F from the cold fuel tank 108. The cooled or cold fuel F may be accumulated during periods when the cooling capacity exceeds the cooling demand, when the cooling capacity would otherwise be wasted and unavailable during periods when the cooling demand exceeds the cooling capacity.

The fuel heater valve 124 may be used to control the flow of heated fuel F, and more particularly, the temperature of the fuel F, provided to the fuel burn location 126. In some embodiments, however, the fuel heater valve 124 may be omitted. In such embodiments, the flow of the fuel F and the temperature of the fuel F provided to the fuel burn location 126 may be controlled using the hot fuel recirculation valve 122 and a discharge temperature of the fuel heater heat exchanger 116. For example, in an exemplary fuel heating loop 104 that omits the fuel heater valve 124, the hot fuel recirculation valve 122 may be closed when the fuel F upon discharge from the fuel heater heat exchanger 116 has a desired temperature for use of the fuel at the fuel burn location 126. More particularly, the fuel recirculation valve 122 may be closed to direct the flow of fuel F to the fuel burn location 126 (rather than the hot fuel tank 118) when the discharge temperature of the fuel F from the fuel heater heat exchanger 116 is within a range of optimum temperatures for use of the fuel F at the fuel burn location 126. For instance, the fuel burn location 126 may be a combustor, e.g., of engine 46 and/or vehicle 10, where the fuel F is burned to provide combustion gases from which thermal and/or kinetic energy may be extracted, and the range of optimum temperatures of the fuel F may correspond to increasing energy within the thermodynamic cycle without harming the fuel F (e.g., causing coke formation or other unwanted chemical reactions due to excessive fuel temperatures) or fuel system components. In some embodiments, a control system, such as the control system 200 described herein, may be used to operate the fuel heater valve 124 and/or the fuel recirculation valve 122, e.g., to direct the fuel F at a temperature within the range of optimum temperatures and/or at a desired fuel flow rate to the fuel burn location 126. Additionally or alternatively, the control system may ensure the fuel F is not too hot when directed to the fuel burn location 126.

As described herein, each of the fuel cooling loop 102 and the fuel heating loop 104 are regenerative loops. That is, the fuel cooling loop 102 is a regenerative fuel cooling loop, and the fuel heating loop 104 is a regenerative fuel heating loop. It will be appreciated that, as used herein, "regenerative" denotes the ability or capacity of the respective fuel loop to replenish its store of cold or hot fuel during operation of the system and, more particularly, to replenish its accumulation of thermal energy in the respective fuel tank 108, 118. For instance, the fuel F may be cooled through heat exchange with a working fluid (such as a refrigerant or engine bleed air) throughout operation of the engine 46, with at least a portion of the cooled fuel F flowing to the cold fuel tank 108 for storage therein, thereby regenerating the store of cold fuel in the system. While more cooled or cold fuel F may flow from the cold fuel tank 108 than to the cold fuel tank 108 during some operational periods, e.g., due to increased cooling demand with decreased cooling capacity of other cooling sources, the store of cooled or cold fuel F may be replenished during other operational periods, e.g., when the cooling demand is relatively low compared with cooling capacity. The regenerative fuel heating loop 104 may operate in a similar manner, where the heated or hot fuel F in the hot fuel tank 118 is alternately depleted or replenished, e.g., depending on the operational mode of the vehicle 10 and/or engine 46, which may dictate heating capacity. It will be understood that the regenerative fuel cooling loop 102 and the regenerative fuel heating loop 104 do not merely replace a mass or volume of fuel F in the respective tank 108, 118, but replenish stores of thermal energy by changing the temperature of the contents of the respective fuel storage tank 108, 118 (lowering the temperature in the cold fuel tank 108 and raising the temperature in the hot fuel tank 118) and then maintaining the tank 108, 118 at the changed temperature.

Turning now to FIG. 3, another exemplary embodiment of the TMS 100 is illustrated. More particularly, FIG. 3 illustrates an exemplary cooling source for cooling the fuel F in the fuel cooling loop 102 and an exemplary heating source for heating the fuel F in the fuel heating loop 104. In the depicted embodiment, the fuel cooling loop 102 includes a coolant flowpath 130 having a coolant C flowing therethrough and a cooling system 132 for cooling the coolant C. The fuel cooler heat exchanger 106 is in fluid communication with both the cold fuel flowpath 110 and the coolant flowpath 130 for heat transfer between the coolant C and the fuel F to cool the fuel.

The cooling system 132 may receive a cooling input, e.g., a flow of the coolant C from a coolant source. The coolant C flows through the cooling system 132 to lower its temperature from an input temperature at a coolant inlet to an output temperature at a coolant outlet. More particularly, the cooling system 132 may be configured to reduce the temperature of the coolant C below a temperature of the fuel F, i.e., the output temperature of the coolant C from the cooling system 132 may be lower than the temperature of the fuel F flowing through the cold fuel flowpath 110.

The coolant C at the lower output temperature flows from the cooling system 132 along the coolant flowpath 130 to the fuel cooler heat exchanger 106. Thus, the TMS 100, via the fuel cooler 106, thermally couples the cold leg or coolant C output from the cooling system 132 to the cold fuel flowpath 110. Additionally or alternatively, at least a portion of the coolant C output from the cooling system 132 may flow to one or more thermal loads 134 to cool the thermal load(s) 134. A refrigerant switching valve 136 may be positioned in the coolant flowpath 130 to control the amount of coolant C that flows to the fuel cooler 106 and/or the coolant-cooled thermal load(s) 134. That is, the refrigerant switching valve 136 may be a flow diverter or a modulating valve that can control a flow split between the fuel cooler 106 and the coolant-cooled thermal load(s) 134. The additional, coolant-cooled thermal load(s) 134 may be vehicle loads, which may be cooled directly with the coolant C or through an intermediate thermal loop, and/or engine loads, e.g., the coolant C may provide lube oil cooling and/or cooling of other engine thermal loads.

Various coolants C may be suitable for use in the TMS 100. In some embodiments, the cooling system 132 and the coolant flowpath 130 may form a closed loop coolant flowpath, i.e., the coolant flowpath 130 is a continuous loop rather than an open loop with a cooling input and an exhaust 138 (i.e., the coolant C is not recirculated in an open loop but flows through the flowpath from the cooling input to the exhaust 138, where it exits the coolant flowpath). In such embodiments, the cooling system 132 may be a refrigeration system, such as a closed loop vapor-compression system, and the coolant C may be a refrigerant. More particularly, the coolant C may be an inert working fluid, such as carbon dioxide ($CO_2$) or another refrigerant.

Refrigeration cycles, e.g., as used in and/or driven by the cooling system 132, are most efficient when operated to a constant thermal load because thermal efficiency can drop quickly at part-power conditions. Thus, the cooling system 132 may be operated to a constant cooling or thermal capacity $TC_{cool}$, with the refrigerant switching or diverter valve 136 partitioning that cooling capacity (i.e., a coolant mass flow at a temperature) between the fuel cooler heat exchanger 106 and the coolant-cooled thermal load 134. As such, the system would functionally be operated to meet the thermal load of 134 at any instance in time with the spare cooling capacity $TC_{cool}$ being used to store cooling capacity in a fuel tank or accumulator 108 as described in greater detail below. The cooling system 132 may be sized against the total cooling demand of the coolant-cooled thermal load 134 and the fuel cooler 106, and the thermal loads may be optimally partitioned between the coolant loop 130 and the cold fuel loop 110 for a given application, where the thermal loads on the coolant loop 130 may be referred to as thermal loads $L_{cool}$ and the thermal loads on the fuel loop 110 may be referred to as thermal loads $L_{fuel}$. It will be appreciated that the cooling or thermal capacity $TC_{cool}$ of the coolant C or coolant loop 130 is a measure of the maximum possible heat transfer rate of the coolant C or coolant loop 130.

In other embodiments, the cooling input to the cooling system 132 is a source of engine bleed air, e.g., an airflow from the engine 46, and the cooling system 132 is an air-based cooling system such as an air cycle machine (ACM) where the coolant C is air. It will be appreciated that, in embodiments where the coolant C is air, the fuel cooler 106 is a direct air-fuel heat exchanger. In other embodiments, the cooling input to the cooling system 132 may be mechanical shaft power or electrical power. Moreover, in appropriate embodiments, the coolant flowpath 130 may be an open loop, e.g., the coolant C flows through the cooling system 132 and the coolant flowpath 130 to a coolant exhaust location 138. Exemplary embodiments of various open loop and closed loop systems and exemplary coolants are described herein. It will be appreciated that other suitable means of reducing the temperature of the coolant C below the temperature of the fuel F may be used as well.

As previously mentioned, the cold fuel tank 108 may be an accumulator of cold or cooled fuel F. More particularly, as shown in FIG. 3, cooled fuel exiting the fuel cooler 106 may either flow along the cold fuel flowpath 110 to cool the fuel-cooled thermal load 114 or to be stored in the cold fuel tank 108 for later use. That is, spare cooling capacity generated by the cooling system 132 may be accumulated in the fuel F stored in the cold fuel tank 108 for later use, e.g., in response to increased cooling demands. As such, the fuel loop 104 has a fuel system thermal capacity $TC_{fuel}$, which may be understood as a measure of the maximum possible heat transfer rate of the fuel loop 104, e.g., at the fuel-cooled thermal load 108.

For instance, during certain operational modes of the engine 46, e.g., during take-off of an aircraft utilizing the engine 46, the cooling capacity of the cooling system 132 may be relatively high, but the cooling demand, e.g., of the fuel-cooled and/or coolant-cooled thermal loads 114, 134, may be relatively low. More specifically, the power generated by the engine 46 during an operational mode such as aircraft take-off may result in a relatively large or high cooling input to the cooling system 132 and a relatively large or high fuel flow rate, but components of the engine 46 and/or aircraft that require cooling have not yet heated to a level to require much cooling, i.e., cooling demand of typical thermal loads such as thermal loads 114, 134 is relatively low. Receiving the relatively high or large cooling input, the cooling system 132 may generate a corresponding cooling capacity in the coolant C flowing through the coolant flowpath 130. That is, an increased cooling input may increase the cooling capacity of the coolant C. However, because the cooling demand is relatively low, the increased cooling capacity could go to waste unless it was stored for later use. Further, it will be appreciated that, during other operational modes of the engine 46, such as cruise or the like, the cooling input may be reduced (e.g., may be relatively low or small compared to the cooling input provided to the cooling system 132 during other operational modes) while the cooling demand, e.g., of the thermal loads 114 and/or 134, may be increased (e.g., may be relatively high or large compared to the thermal load(s) 114, 134 during other operational modes).

Stated differently, the thermal capacity $TC_{cool}$ of cooling system 132 generally is proportional to engine power because the cooling system 132 ultimately rejects heat to, e.g., a fan stream or duct such as the bypass airflow passage 82 of the engine 46. Fuel cooling capacity $TC_{fuel}$ generally is also proportional to engine power because the fuel flow rate is proportional to engine power. However, not all contributors to the fuel-cooled thermal loads 114 ($L_{fuel}$) and coolant-cooled thermal loads 134 ($L_{cool}$) are proportional to engine power. For example, hot day engine idle may produce excess heat in the engine lubricating oil system because the engine fuel flow is too low to absorb all the oil heat. Further, aircraft systems may utilize a combination of coolant and fuel cooling, but such systems may be electric power generation and/or aircraft systems that operate at high heat dissipation levels independent of engine power. Accordingly, a mismatch may arise between cooling capacity and cooling demand, e.g., cooling capacity $TC_{cool}$ of the cooling system 132 may be relatively high while the cooling demand $L_{fuel}$, $L_{cool}$ of the thermal loads 114, 134 is relatively low and vice versa.

As such, it may be advantageous to store the excess cooling capacity $TC_{cool}$ generated during some operational modes for use during other operational modes, e.g., to increase efficiency of the engine 46 and/or vehicle 10 by not letting the excess cooling capacity go to waste and/or to have the needed cooling capacity to meet the cooling demand during periods of decreased cooling generation. As described herein, the fuel F circulating through the system 100 can provide such cooling storage. More specifically, excess cooling capacity $TC_{cool}$ may be accumulated in the fuel F circulating within the fuel cooling loop 102, and such accumulated cooling capacity may be used during periods of increased cooling demand.

Comparing FIGS. 2 and 3, the fuel-cooled thermal load 114 may be disposed either upstream or downstream of a flow $F_{source}$ of the fuel from the fuel tank 95 to the heating loop 104, which is controlled by a flow splitting or flow diverter valve 113 that splits or diverts the flow of fuel F between the cold fuel flowpath 130 and the connector line 144 with the heating loop 104. More particularly, as shown in FIG. 2, the thermal load 114 is disposed downstream of the valve 113, in any position of the valve 113. As depicted in FIG. 3, the thermal load 114 is disposed upstream of the valve 113 for a flow $F_{source}$ of the fuel from the fuel tank 95 to the heating loop 104, without passing through the cooling loop 102.

Referring particularly to FIG. 3, the depicted fuel heating loop 104 includes a hot fluid flowpath 140 and a heat source 142 for providing a flow of a hot fluid H along the hot fluid flowpath 140. As shown in FIG. 3, the fuel heater heat exchanger 116 is in fluid communication with both the hot fuel flowpath 120 and the hot fluid flowpath 140 to heat the fuel F. Further, the fuel heater heat exchanger 116 is downstream from the fuel-cooled thermal load(s) 114 and receives the flow of fuel F from the fuel cooling loop 102 after the fuel F exchanges heat with the thermal load(s) 114 to cool the thermal load(s) 114, which warms the fuel F. More particularly, as illustrated in FIGS. 2 and 3, a fuel connector line 144 fluidly couples or connects the cold fuel flowpath 110 and the hot fuel flowpath 120. Accordingly, the fuel F in the fuel heating loop 104 flows downstream from the fuel cooling loop 102 to the fuel heating loop 104, and from the fuel heating loop 104 to the fuel burn location 126 for consumption of the fuel F, and the fuel F thermally connects the cold fuel tank 108 and the hot fuel tank 118.

Referring still to FIG. 3, the fuel pump 128 may be disposed in or along the fuel connector line 144 for driving the fuel F between the cold fuel flowpath 110 and the hot fuel flowpath 120, or from the fuel cooling loop 102 to the fuel heating loop 104. In some embodiments, the fuel pump 128 is disposed along the fuel connector line 144 downstream of the fuel-cooled thermal load(s) 114 and the cold fuel flowpath 110. For instance, as illustrated in FIG. 3, the fuel pump 128 may be part of the fuel heating loop 104 such that any heat contributed by the fuel pump 128 to the fuel F is more efficiently utilized by heating the fuel F in the portion of the system 100 in which heat is intended to be added to the fuel F.

In various embodiments, the heat source 142 is an airflow at an elevated temperature, e.g., greater than a maximum fuel temperature, which may be the pyrolytic limit of the fuel F and in exemplary embodiments, the maximum fuel temperature may be within a range of 600° F. to 1000° F. For example, the hot fluid H may be engine bleed air of a gas turbine engine, such as the engine 46. In some embodiments, the system 100 comprises a power unit including a turbine and a generator, and the hot fluid H is discharged air from the turbine. It will be appreciated that the power unit may be an auxiliary power unit that is used to generate power for specific systems, units, or the like of the vehicle 10 and/or engine 46. In such embodiments, the turbine may receive a flow of combustion products, e.g., from a burner or the like. More particularly, the burner may receive engine bleed air and fuel, e.g., from a fuel source such as fuel tank 95, which mix and burn in the burner to form the combustion products. In still other embodiments, the hot fluid H may be discharge air from other engine and/or vehicle heat loads. For instance, the heat source 142 for an aircraft vehicle may be cooled cooling air, an environmental control system (ECS) precooler, a waste heat recovery loop, etc.

As further shown in FIG. 3, upon exit from the fuel heater heat exchanger 116, the hot fluid H may be used for cooling or other thermal management purposes at a downstream location 146. For instance, where the hot fluid H is air, such as engine bleed air or the like, the air may be cooler when it exits the fuel heater heat exchanger 116 than when it enters the fuel heater heat exchanger 116 due to heat exchange with the cooler fuel F. As such, the exiting air may be used to cool one or more components of the apparatus in which the system 100 is installed, such as vehicle 10 and/or engine 46. As one example, the air discharged or exhausted from the fuel heater heat exchanger 116 may be used for turbine cooling of the turbine portion 60, 62 of the engine 46. Where the air is engine bleed air, which may have been used for turbine cooling in the absence of the system 100, passing the engine bleed air through the system 100 may further cool the cooling air, i.e., may cool the engine bleed air before it is used for turbine cooling, which may increase the turbine cooling capacity of the air, etc. In other embodiments, the hot fluid H may be used in other ways upon exiting the fuel heater heat exchanger 116.

As previously described, the hot fuel tank 118 may be an accumulator of hot or warmed fuel F. More particularly, the hot fuel tank 118 is configured for accumulating at least a portion of the heated fuel F discharged from the fuel heater heat exchanger 116. That is, at least a portion of the fuel F heated in the fuel heater heat exchanger 116 may flow along the hot fuel flowpath 120 from the fuel heater heat exchanger 116 to the hot fuel tank 118, where the heated fuel F may be stored for use during certain operational modes of, e.g., the vehicle 10 and/or engine 46. Thus, the hot fuel tank 118 may be a fuel tank that is operated as accumulator of heated fuel. Further, it will be appreciated that the term "heated fuel F" as used herein denotes fuel F that has been heated through heat exchange, e.g., with the thermal load(s) 114, the hot fluid H, etc. Therefore, "heated fuel" may refer to fuel F that is at a higher temperature after heat exchange with a hot fluid, such as the hot fluid H from the heat source 142, than before heat exchange with the hot fluid. Moreover, as further described herein, the heated fuel F is at a higher or greater temperature than the fuel F stored in the main fuel tank 95 and/or delivered to the hot fuel flowpath 120 from the cold fuel flowpath 110.

As described with respect to FIG. 2, a remaining portion of the heated fuel F (i.e., the portion of the fuel F that does not flow to the hot fuel tank 118) may flow to the fuel burn location 126 that is downstream of the fuel heater heat exchanger 116. Accordingly, the fuel F may be heated through heat exchange with the hot fluid H before flowing to the hot fuel tank 118 (which may be referred to as fuel flow $F_{Htank}$), where the heated fuel F is stored for later use, and/or the fuel burn location 126 (which may be referred to as fuel flow $F_{burn}$), where the heated fuel F is available for consumption by the vehicle 10 and/or engine 46. That is, spare heating capacity $HC_{heat}$ generated by the heat source 142 may be accumulated in the fuel F stored in the hot fuel accumulator or tank 118 for later use, e.g., in response to increased fuel demands $D_{fuel}$. As such, the fuel heating loop 104 has a fuel system heating capacity $HC_{fuel}$, which may be understood as a measure of the maximum possible heat transfer rate of the fuel heating loop 104, e.g., at the fuel heater heat exchanger 116.

Thus, similar to the fuel cooling loop 102, the fuel heating loop 104 may utilize the thermal capacity of the fuel F, e.g., to improve the efficiency of an engine and/or vehicle comprising the system 100. More particularly, the fuel heating loop 104 may be regeneratively operated to heat the fuel F therein during periods of extra heat generation (e.g., high-power modes of a gas turbine engine and/or aircraft) and to accumulate the heated fuel F in the hot fuel tank 118, e.g., to provide fuel at a desired elevated temperature during operating conditions when the heat source 142 cannot heat the fuel F to the desired elevated temperature. For instance, heat may be stored in the fuel F during a high-power takeoff mode or operating condition of the aircraft 10 (or engine 46 used in an aircraft). The stored fuel F, heated during the high-power mode, may be used during a low-power mode or operating condition, such as cruise. Thus, the benefits of hot fuel may be realized at low-power or cruise-type conditions using heat stored during high-power or take-off conditions.

Turning to FIGS. 4 through 7, in some embodiments, the system 100 may include a thermal transport bus. Accordingly, rather than directly cooling the fuel F with the coolant C and/or directly heating the fuel F with the hot fluid H, the exemplary system 100 illustrated in FIGS. 4-7 utilizes a thermal transport fluid T to cool and heat the fuel F. In turn, the thermal transport fluid T is cooled at least in part by the coolant C and the fuel F, and the thermal transport fluid T is heated at least in part by the hot fluid H from the heat source 142. The heat source 142 has a heating capacity $HC_{heat}$ that may fluctuate, e.g., based on an operational condition of the engine 46, the vehicle 10, etc., and may be understood as a measure of the maximum possible heat transfer rate of the heat source 142 at a given time. Thus, the thermal transport flowpath 150, rather than the hot fuel flowpath 120, places a heating demand $D_{heat}$ on the heat source 142. Separating the fuel F from the coolant C and/or the hot fluid H may be desirable, e.g., to increase the safety of the system 100 by reducing the risk of ignition of the fuel due to accidental exposure to air, which is a non-inert fluid and may be at an elevated temperature. More particularly, the thermal transport fluid T may be an inert working fluid, which may have reduced flammability, thereby reducing fire risks if exposed to the fuel F, the coolant C, and/or the hot fluid H.

Referring particularly to FIGS. 4 and 5, FIG. 4 schematically illustrates a system 100 having a closed coolant loop and utilizing a thermal transport bus for heat exchange. FIG. 5 schematically illustrates a system 100 having an open coolant flowpath 130 and utilizing a thermal transport bus for heat exchange. Thus, the coolant flowpath 130 is a closed loop in the embodiment of FIG. 4 but exhausts at the coolant exhaust location 138 in the embodiment of FIG. 5. As described above, a coolant C such as an inert refrigerant may be used in closed systems such as illustrated in FIG. 4, and a coolant C such as air (e.g., engine bleed air) may be used in open systems like the system 100 illustrated in FIG. 5.

Each of FIG. 4 and FIG. 5 illustrate an exemplary system 100 including a thermal transport flowpath 150 having the thermal transport fluid T flowing therethrough. The thermal transport flowpath 150 extends in a closed loop through both the fuel cooling loop 102 and the fuel heating loop 104. In the fuel cooling loop 102, a coolant-transport heat exchanger 152 is in fluid communication with both the coolant flowpath 130 and the thermal transport flowpath 150 to cool the thermal transport fluid T. The cooled thermal transport fluid T may then flow along the thermal transport flowpath 150 to cool one or more thermal loads 154, which may be referred to as bus-cooled thermal loads 154. It will be appreciated that the thermal load(s) 154 may impart heat $Q_{in}$ to the thermal transport fluid T, warming the thermal transport fluid T as it exits the fuel cooling loop 102 and flows to the fuel heating loop 104.

The refrigerant switching valve 136 is disposed between the fuel cooler heat exchanger 106 and the coolant-transport heat exchanger 152. Using the valve 136, the flow of the coolant C may be modulated to distribute the coolant C between the cooling demand of the bus-cooled thermal load(s) 154 and/or cooling storage. For example, the refrigerant switching valve 136 may be used to control how much of the coolant C passes from the cooling system 132 to the coolant-transport heat exchanger 152 to cool the thermal transport fluid T or to the fuel cooler 106 to exchange heat with the fuel F to store the cooling capacity of the coolant C in the fuel F. Similarly, the cold fuel recirculation valve 112 may be used to control how much of the fuel F passes from the fuel cooler 106 to cool the fuel-cooled thermal load(s) 114 (and then to the fuel heating loop 104) as fuel flow $F_{cool}$ or to the cold fuel tank 108 as fuel flow $F_{Ctank}$ to store the fuel F cooled by heat exchange with the coolant C in the cold fuel tank 108.

As an example of a method of operating the system 100 illustrated in FIGS. 4 and 5, during periods of relatively low cooling demand by the bus-cooled thermal load(s) 154, the refrigerant switching valve 136 may be fully or substantially closed such that all or nearly all of the coolant C flows to the fuel cooler 106. Thus, through heat exchange with the fuel F in the fuel cooler 106, the excess capacity of the cooling system 132 may be stored in the cold fuel tank 108. During periods of relatively high cooling demand by the bus-cooled thermal load(s) 154, the refrigerant switching valve 136 may be fully or substantially open such that all or nearly all of the coolant C flows to the bus-cooled thermal load(s) 154 to cool the load(s) 154.

Further, in the exemplary embodiments of FIGS. 4 and 5, a recuperator 156 is disposed along the thermal transport flowpath 150 downstream from the bus-cooled thermal load(s) 154. As such, the thermal transport fluid T flows from the thermal load(s) 154 to the recuperator 156, where the thermal transport fluid T may be warmed or heated through heat exchange with thermal transport fluid T exiting the fuel heater heat exchanger 116. More particularly, after exchanging heat with the fuel F in the fuel heater heat exchanger 116, the exiting thermal transport fluid T remains at a higher temperature than the thermal transport fluid T entering the fuel heating loop 104 from the fuel cooling loop 102. Thus, what may otherwise be waste heat in the thermal transport fluid T exiting both the heat exchanger 116 and the fuel heating loop 104 is imparted to the incoming thermal transport fluid T, i.e., the thermal transport fluid T entering the fuel heating loop 104. Accordingly, the recuperator 156 can help reduce heat waste and reduce the amount of heat that is rejected to the vehicle 10 and/or engine 46 from the thermal transport bus. Further, pre-heating the thermal transport fluid T entering the fuel heating loop 104 may reduce demand on the heat source 142, e.g., reduce engine bleed air needed to heat the thermal transport fluid T for heating the fuel F, and/or may reduce demand on the cooling system 132 by reducing thermal loads requiring cooling due to the rejection of heat from the thermal transport bus.

Keeping with FIGS. 4 and 5, the thermal transport fluid T flowing from the fuel cooling loop 102 flows from the recuperator 156 into a bus heater heat exchanger 158, which also may be referred to as bus heater 158. In the exemplary embodiments of FIGS. 4 and 5, the bus heater 158, rather than the fuel heater heat exchanger 116, receives the flow of the hot fluid H such that the thermal transport fluid T is heated through heat exchange with the hot fluid H flowing from the heat source 142. In exemplary embodiments, the hot fluid H is engine bleed air as described herein. After exchanging heat with the thermal transport fluid T to heat the transport fluid T, the hot fluid H may be exhausted at a location 159 downstream from the bus heater 158. The exhausted hot fluid H, which has been cooled through heat transfer with the thermal transport fluid T, may be used for cooling one or more components and/or sections of the vehicle 10 and/or engine 46. For example, the hot fluid H exhausted from the bus heater 158 may be used for turbine cooling in the engine 46.

From the bus heater 158, the heated thermal transport fluid T then flows to the fuel heater heat exchanger 116, where the thermal transport fluid T exchanges heat with the fuel F to heat the fuel F. That is, the fuel heater heat exchanger 116 is a transport-fuel heat exchanger in fluid communication with both the thermal transport flowpath 150 and the hot fuel flowpath 120 for heat transfer between the thermal transport fluid T and the fuel F to heat the fuel F. The heated fuel F may flow to the fuel burn location 126 and/or the hot fuel tank 118 as described with respect to FIGS. 2 and 3.

As previously described, the thermal transport fluid T flows from the fuel heater 116 along the thermal transport flowpath 150 to the recuperator 156, such that the thermal transport fluid T exiting the fuel heating loop 104 may be used to pre-heat the thermal transport fluid T entering the fuel heating loop 104. Referring particularly to FIG. 4, a bus cooler heat exchanger 160, which also may be referred to as bus cooler 160, may be disposed downstream from the recuperator 156 and upstream from the coolant-transport heat exchanger 152. It will be appreciated that the bus cooler 160 may further cool the thermal transport fluid T, which has been cooled through heat exchange in the recuperator 156, before the thermal transport fluid T enters the coolant-transport heat exchanger 152, where the thermal transport fluid is further cooled by the coolant C. Thus, as described with respect to the recuperator 156, the thermal transport fluid T may be pre-cooled, e.g., to reduce the cooling demand on the cooling system 132 to cool the thermal transport fluid T. In exemplary embodiments, air may be used as the heat exchange fluid in the bus cooler 160 to cool the thermal transport fluid T. More particularly, the bus cooler 160 may be a fan stream or TMS duct heat exchanger, a fan outlet guide vane (OGV) heat exchanger, a surface cooler, a vehicle heat sink, a fuel deoxygenation until heat input, etc.

A bus cooler bypass line 162, in which a bus cooler bypass valve 164 is disposed, may extend from the thermal transport flowpath 150 around the bus cooler 160 to allow the thermal transport fluid T to bypass the bus cooler 160. That is, in some operating modes, it may be desirable to bypass the bus cooler 160, and the bus cooler bypass valve 164 may be open to allow the thermal transport fluid T to flow along the bus cooler bypass line 162 rather than through the bus cooler 160. The bus cooler bypass valve 164 may be a flow diverter or modulating valve for controlling the flow of the thermal transport fluid T between the flowpath 150 and the bypass line 162.

In the exemplary embodiment of FIG. 5, the bus cooler 160 is omitted. In such embodiments, the discharge of the coolant C from the fuel cooler heat exchanger 106, which flows to the coolant-transport heat exchanger 152 for heat exchange with the thermal transport fluid T, may be used as a bus cooler. Such configurations may require an additional heat sink and/or a larger cooling system 132 to adequately cool the coolant C such that the coolant C can absorb an adequate amount of heat from the thermal transport fluid T. Further, as shown in FIG. 5, a coolant-transport bypass line 166 may extend from the thermal transport flowpath 150 around the coolant-transport heat exchanger 152. A coolant-transport bypass valve 168 is disposed in the bypass line 166. The coolant-transport bypass line 166 and bypass valve 168 allow the thermal transport fluid T to bypass the coolant-transport heat exchanger 152. Like the bus cooler bypass, comprising line 162 and valve 164, in some operating modes, it may be desirable to bypass the coolant-transport heat exchanger 152, and the coolant-transport bypass valve 168 may be open to allow the thermal transport fluid T to flow along the coolant-transport bypass line 166 rather than through the coolant-transport heat exchanger 152. For example, the thermal transport fluid T may be scheduled to bypass the coolant-transport heat exchanger 152 in fuel heating cycles, and the coolant-transport bypass valve 168 may be closed (i.e., preventing bypass of heat exchanger 152) to cool the thermal transport fluid T when the fuel F in the hot fuel tank 118 is sufficiently hot, which cooler transport fluid T benefits the bus-cooled load(s) 154. The coolant-transport bypass valve 168 may be a flow diverter or modulating valve for controlling the flow of the thermal transport fluid T between the flowpath 150 and the bypass line 166.

As illustrated in FIGS. 4 and 5, the TMS 100 may include a transport pump 169 disposed in the thermal transport flowpath 150. The transport pump 169 helps drive the thermal transport fluid T along the thermal transport flowpath 150. Although illustrated in the fuel cooling loop 102 portion of the transport bus, it will be appreciated that the transport pump 169 may be disposed at any suitable location along the thermal transport flowpath 150. For instance, the transport pump 169 may be positioned in the fuel heating loop 104 portion of the transport bus, e.g., upstream of the bus heater 158, to take advantage of or utilize any heat imparted to the thermal transport fluid T by the transport pump 169. Of course, the location of the transport pump 169 also may be determined based on the flow characteristics of the thermal transport flowpath 150 or the like.

Turning now to FIG. 6, an exemplary system 100 is illustrated having the fuel pump 128 disposed in the fuel heating loop 104. The exemplary systems 100 of FIGS. 4 and 5 include the fuel pump 128 in the fuel cooling loop 102. However, as previously described, disposing the fuel pump 128 in the fuel heating loop 104 may advantageously eliminate pump heat addition to the fuel cooling loop 102. Further, the fuel heater valve 124 may be used to manage the volume of hot fuel F in the hot fuel tank 118. For example, the fuel heater valve 124 may be closed to close off the hot fuel tank 118 to accumulate or store hot fuel F for later use. The fuel heater valve 124 may be open to allow the fuel F to circulate through the fuel heating loop 104, e.g., for further heating in the fuel heater heat exchanger 116 and/or for consumption at the fuel burn location 126.

FIG. 6 illustrates a closed cooling loop TMS 100 similar to the closed cooling loop system illustrated in FIG. 4. However, in addition to the relocation of the fuel pump 128 and the inclusion of the fuel heater valve 124, the TMS 100 shown in FIG. 6 omits the recuperator 156 depicted in FIG. 4. Thus, direct heat exchange is omitted between the thermal transport fluid T flowing from the bus-cooled load(s) 154 and the thermal transport fluid T exiting the fuel heater 116. Nevertheless, in some embodiments, the thermal transport flowpath 150 may be constructed such that the thermal transport fluid T flowing into the fuel heating loop 104 is in sufficient proximity to the thermal transport fluid T flowing out of the fuel heating loop 104 for heat exchange between the exiting thermal transport fluid T and the incoming thermal transport fluid T. Further, it will be appreciated that in other embodiments, the system 100 depicted in FIG. 6 may include the recuperator 156. In still other embodiments, the system 100 depicted in FIG. 6 may utilize an open cooling loop (e.g., similar to the open cooling loop of FIG. 5) rather than a closed cooling loop.

Referring to FIGS. 7A and 7B, other exemplary embodiments of the system 100 may include an intermediate bus heater to pre-heat the thermal transport fluid T entering the fuel heating loop 104. More particularly, FIGS. 7A and 7B illustrate a closed cooling loop system 100 similar to the closed cooling loop system of FIGS. 4 and 6; however, open cooling loop systems, similar to the system 100 shown in FIG. 5, could incorporate an intermediate bus heater such as illustrated in FIGS. 7A and 7B. As shown in FIG. 7A, the exemplary system 100 includes a second hot fluid flowpath and a second heat source 172 that supplies a flow of a second hot fluid $H_2$ along the second hot fluid flowpath 170 to an intermediate bus heater heat exchanger 174, or intermediate bus heater 174. The intermediate bus heater 174 is disposed along the thermal transport flowpath 150 downstream from the bus-cooled load(s) 154 and upstream from the bus heater 158. That is, the thermal transport fluid T flows along the thermal transport flowpath 150 from the bus-cooled load(s) 154 to the intermediate bus heater 174 and then to the bus heater 158. The intermediate bus heater 174 is in fluid communication with both the thermal transport flowpath 150 and the second hot fluid flowpath 170 to heat the thermal transport fluid T.

In some embodiments, the second heat source 172 may be a lower temperature heat source than the heat source 142. More particularly, the second hot fluid $H_2$ provided from the second heat source 172 may be at a lower temperature than the hot fluid H provided from the heat source 142. For example, the each hot fluid H, $H_2$ may be engine bleed air, but the hot fluid H may be provided from a first section of the engine 46 that is at a higher temperature than a second section of the engine 46, which provides the lower temperature second hot fluid $H_2$, e.g., the second hot fluid $H_2$ may be inter-stage compressor bleed air supplied from an earlier stage of the compressor section than the hot fluid H, which is supplied from a later, downstream stage of the compressor section. Accordingly, the intermediate bus heater 174, which receives the second hot fluid $H_2$ for heat exchange with the thermal transport fluid T, may be referred to as a low temperature bus heater, and the bus heater 158, which receives the hot fluid H for heat exchange with the thermal transport fluid T, may be referred to as a high temperature bus heater. As previously described, the intermediate or low temperature bus heater 174 pre-heats the thermal transport fluid T upstream of the high temperature bus heater 158, e.g., to increase the efficiency of the system 100.

As further shown in FIG. 7A, upon exit from the intermediate bus heater 174, the second hot fluid $H_2$ may be used for cooling or other thermal management purposes at a downstream location 176, which may be the same or a different downstream location as downstream location 146. For instance, where the second hot fluid $H_2$ is air, such as engine bleed air or the like, the air may be cooler when it exits the intermediate bus heater 174 than when it enters the intermediate bus heater 174 due to heat exchange with the cooler thermal transport fluid T. As such, the exiting air may be used to cool one or more components of the apparatus in which the system 100 is installed, such as vehicle 10 and/or engine 46. As one example, the air discharged or exhausted from the intermediate bus heater 174 may be used for turbine cooling of the turbine portion 60, 62 of the engine 46. Where the air is engine bleed air, which may have been used for turbine cooling in the absence of the system 100, passing the engine bleed air through the system 100 may further cool the cooling air, i.e., may cool the engine bleed air before it is used for turbine cooling, which may increase the turbine cooling capacity of the air, etc. In other embodiments, the second hot fluid $H_2$ may be used in other ways upon exiting the intermediate bus heater 174.

Referring particularly to FIG. 7B, in some embodiments, the system 100 may include a heat source modulation valve 178 disposed in the hot fluid flowpath 140 between the heat source 142 and the bus heater 158 and a second heat source modulation valve 179 disposed in the second hot fluid flowpath 170 between the second heat source 172 and the intermediate bus heater 174. More specifically, as previously described, the heat source 142 for the hot fluid H may be supplied from a different part of the vehicle 10 and/or engine 46 and/or may be supplied at different times during operation of the vehicle 10 and/or engine 46 than the second heat source for the second hot fluid $H_2$. For instance, the heat sources 142, 172 may supply hot fluids at different temperatures, e.g., the hot fluid H may be hotter, or at a greater or higher temperature than, the second hot fluid $H_2$. The heat source modulation valves 178, 179 may control the amount of heating (i.e., the flow of the hot fluids H, $H_2$) from the different temperature heat sources 142, 172 based on, e.g., the source temperature of the respective heat source 142, 172, fuel heating demand, and/or the downstream turbine cooling demand (or other heat sink demand) such as at downstream locations 146, 176. That is, each heat source modulation valve 178, 179 may be modulated between fully open, partially open, or fully closed during different operational modes or conditions, e.g., to vary the flow of the respective hot fluid H, $H_2$ based on the respective source temperature, fuel heating demand, and/or heat sink demand during the respective operational mode.

In at least some embodiments of the system 100 as described herein, the fuel F may be a deoxygenated fuel, and the fuel cooling loop 102 and the fuel heating loop 104 may be deoxygenated fuel loops disposed between the main engine fuel tank 95 and the combustor 58 of the engine 46. More particularly, as described herein, fuel for a gas turbine engine and/or vehicle such as an aircraft may be an efficient heat sink to receive at least some of the heat generated during operation of the engine and/or vehicle, due at least in part to the fuel's heat capacity and an increased efficiency in engine power operation by heating the fuel to provide additional thermal energy to the thermodynamic cycle. However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Thus, the engine and/or vehicle may include a fuel oxygen reduction unit for such a purpose. In some deoxygenated fuel embodiments, the bus cooler 160 also may be used to supply heat input to the fuel oxygen reduction unit. As used herein, the term "fuel oxygen reduction unit" generally means a device capable of reducing a free oxygen content of the fuel, such as a fuel deoxygenation unit, a fuel oxygen conversion unit, etc.

As depicted in FIG. 2, where the fuel F is a deoxygenated fuel, the system 100 may further comprise a source of inert gas 182 and an inert gas flowpath 180 extending from the inert gas source 182. The inert gas flowpath 180 is in fluid communication with the hot fuel tank 118 to provide inert gas ullage G to the hot fuel tank 118. More specifically, inert gas G is provided to the hot fuel tank 118 to prevent the hot fuel tank 118 from filling with air as the hot fuel tank 118 empties, e.g., as heated fuel F flows from the hot fuel tank 118 during a low-power operating mode as described herein, as mixing fuel F with air poses a fire risk.

As previously described, the deoxygenated fuel F may be a product of a fuel oxygen reduction unit and may be used when it is desirable to burn fuel at an elevated temperature, e.g., to prevent coking of one or more fuel system components. As illustrated in FIG. 2, in some embodiments, the system 100 may include a deoxygenated fuel source 184, which need not be a fuel tank or the like. Rather, the deoxygenated fuel source 184 may schematically represent the flow of deoxygenated fuel F from the fuel oxygen reduction unit.

A fuel oxygen reduction unit generally may include a contactor, a fuel gas separator, and a circulation gas flowpath extending from the fuel gas separator to the contactor. The fuel oxygen reduction unit generally may provide for a flow of stripping gas through the circulation gas flowpath during operation. It will be appreciated that the term "stripping gas" is used herein as a term of convenience to refer to a gas generally capable of performing the functions described herein. The stripping gas flowing through the stripping gas flowpath/circulation gas flowpath may be an actual stripping gas functioning to strip oxygen from the fuel within the contactor. Alternatively, the stripping gas flowing through the flowpath may be a sparging gas bubbled through a liquid fuel to reduce an oxygen content of such fuel. For example, the stripping gas may be an inert gas, such as nitrogen or carbon dioxide (CO2), an inert gas mixture, or some other gas or gas mixture having a relatively low oxygen content. Thus, in some embodiments, the inert gas source 182 also may function as a source of stripping gas.

Moreover, an exemplary fuel oxygen reduction unit may further include a gas boost pump, a gas oxygen reduction unit or catalyst, and a pre-heater. The catalyst may be positioned in the circulation gas flowpath for reducing an oxygen content of the flow of stripping gas through the circulation gas flowpath. The pre-heater may be positioned in thermal communication with the circulation gas flowpath upstream of the catalyst to increase oxygen reduction by the catalyst. In other embodiments, the pre-heater and the catalyst may be formed as a single unit, such that the unit heats the stripping gas to increase oxygen reduction by the unit. The gas boost pump may be positioned in airflow communication with the circulation gas flowpath for increasing a pressure of the flow of stripping gas to the circulation gas flowpath. Of course, it will be appreciated that any suitable fuel oxygen reduction unit, having any appropriate configuration, may be used to generate or produce the deoxygenated fuel that flows, e.g., from the deoxygenated fuel source 184.

In at least some embodiments of the system 100 depicted in the figures, a valve, and in some instances additional fluid conduit, is included to bypass a heat exchanger and/or other components of the system 100. However, it will be appreciated that, in some embodiments, minimizing valves and/or conduits may be desirable. For example, a reduced number of valves and/or conduits may reduce the complexity, weight, etc. of the system 100. Reduced system complexity may offer manufacturing, installation, and service advantages (such as decreased time and cost of manufacturing, installation, and/or servicing, as well as requiring a smaller envelope for installation compared to more complex systems). Reduced weight may offer advantages such as increased engine efficiency, decreased fuel burn requirements, etc. Accordingly, for at least some embodiments, the numbers of valves and/or conduits may be optimized, e.g., such that a bypass line is not provided for every heat exchanger, but the respective fluids are allowed to flow through the respective heat exchanger. As one example, in some embodiments, the bus cooler bypass line 162 and its associated bypass valve 164 may be omitted, with the fuel F instead always passing through the bus cooler 160.

Moreover, it will be appreciated that, although sometimes described in singular terms, the fuel-cooled thermal load 114, the coolant-cooled thermal load 134, and/or the bus-cooled thermal load 154 may represent one or more thermal loads in need of cooling by the fuel F, the coolant C, and the thermal transport fluid T, respectively. For example, the fuel-cooled thermal load 114 may be two or more systems, components, or the like of the engine 46 and/or vehicle 10 that are cooled by thermal communication with the fuel F. As another example, the coolant-cooled thermal load 134 may be two or more systems, components, or the like of the engine 46 and/or vehicle 10 that are cooled by thermal communication with the coolant C. As yet another example, the bus-cooled thermal load 154 may be two or more systems, components, or the like of the engine 46 and/or vehicle 10 that are cooled by thermal communication with the thermal transport fluid T. Further, the bus-cooled thermal load 154 may include an oil tank, a pre-cooler, and/or other such components or systems of an engine and/or vehicle, such as engine 46 and vehicle 10. It will be appreciated that the thermal load 154 may be the same as the thermal load 134, e.g., in embodiments in which the thermal transport loop or flowpath 150 is interposed between the coolant C and the thermal load as a buffer between the two media (such as air and fuel).

The foregoing descriptions of the system 100 also may be understood as describing one or more methods of operating the system 100, e.g., for storing and/or accumulating cooling capacity in fuel of a vehicle and/or engine while also storing and/or accumulating heated fuel for consumption by the vehicle and/or engine. For example, a method of operating the system 100 may comprise selectively operating a fuel cooling loop 102 that is in thermal communication with a cooling system 132 to cool a fuel F flowing through the fuel cooling loop 102 and to accumulate the cooled fuel F in a cold fuel tank 108. The method may further comprise selectively operating the fuel cooling loop 102 to flow the fuel F to a fuel heating loop 104. The method also may comprise selectively operating the fuel heating loop 104 that is in thermal communication with a heat source 142, 172 to heat the fuel F flowing through the fuel heating loop 104 and to accumulate the heated fuel F in a hot fuel tank 118. Additionally, the method may comprise selectively operating the fuel heating loop 104 to flow at least a portion of the fuel F to a fuel burn location 126 for consumption of the fuel F and to recirculate a remaining portion of the fuel F through the fuel heating loop 104.

It will be appreciated that, as described herein, "selectively operating" refers to modulation of a flow of fluid along a flowpath. For instance, a cold fuel recirculation valve 112 may be disposed in the fuel cooling loop 102 for selectively operating the fuel cooling loop 102. More particularly, the cold fuel recirculation valve 112 may be selectively opened or closed, such that the valve 112 is fully open, partially open, or fully closed, to modulate the flow of the fuel F along the cold fuel flowpath 110. The cold fuel recirculation valve 112 directs either all, a portion of, or none of the fuel F to the cold fuel tank 108, which is disposed in the cold fuel flowpath 110 downstream from the cold fuel recirculation valve 112, as fuel flow $F_{Ctank}$. The fuel F that is directed away from the cold fuel tank 108 may flow along the fuel cooling loop 102 as fuel flow $F_{cool}$ to cool one or more fuel-cooled loads 114 that are in thermal communication with the fuel cooling loop 102. From the fuel-cooled load(s) 114, the fuel F flows to the fuel heating loop 104, which is downstream from the fuel cooling loop 102.

Similar to the cold fuel recirculation valve 112, a hot fuel recirculation valve 122 may be disposed in the fuel heating loop 104 for selectively operating the fuel heating loop 104. Further, a fuel heater valve 124 may be disposed in the fuel heating loop 104 for selectively operating the fuel heating loop 104 to accumulate the heated fuel F in the hot fuel tank 118. As described herein, the hot fuel recirculation valve 122 may be selectively opened or closed, such that the valve 122 is fully open, partially open, or fully closed, to modulate the flow of the fuel F along the hot fuel flowpath 120. The hot fuel recirculation valve 122 directs either all, a portion of, or none of the fuel F to the hot fuel tank 118, which is disposed in the hot fuel flowpath 120 downstream from the hot fuel recirculation valve 122, as fuel flow $F_{Htank}$. The fuel F that is directed away from the hot fuel tank 118 may flow along the fuel heating loop 104 to the fuel burn location 126 as fuel flow $F_{burn}$, where the heated fuel (the fuel F passes through the fuel heater 116 upstream of the fuel burn location 126) may be consumed. The fuel heater valve 124 may be selectively opened or closed, such that the valve 124 is fully open, partially open, or fully closed, to modulate the flow of the fuel F between accumulation in the hot fuel tank 118 and recirculation through the fuel heater 116.

In some embodiments, the cold fuel tank 108 and/or the hot fuel tank 118 may be used as a heat exchanger, e.g., to eliminate an intermediate heat exchanger (such as the fuel cooler 106 and/or the fuel heater 116) from the system 100. For instance, the coolant C may flow through the cold fuel tank 108 to directly cool the fuel F, and/or the hot fluid H or thermal transport fluid T may flow through the hot fuel tank 118 to directly heat the fuel F. In such embodiments, it may be desirable to isolate the fuel F from direct heat exchange with air, particularly engine bleed air, e.g., for safety reasons stemming from a failed heat exchanger component or the like. Accordingly, direct fuel tank cooling embodiments, in which the fuel cooler and cold fuel tank are a single component, and direct fuel tank heating embodiments, in which the fuel heater and hot fuel tank are a single component, may be most suitable for use with inert working fluids, e.g., where the coolant C and/or the thermal transport fluid T are inert working fluids. Such working fluids are described in greater detail below and, generally, are working fluids that are not air (e.g., engine bleed air) or the fuel F (e.g., the fuel used in the propulsion system of the engine 46 and/or vehicle 10 as well as in the system 100).

In some embodiments, a method of operation of the system 100 also may include selectively operating a thermal transport loop 150 that is in thermal communication with both a transport-cooled thermal load 154 and a heat source, such as the bus heater 158, such that the thermal transport loop cools the transport-cooled thermal load 154 and heats the fuel F. More particularly, a thermal transport fluid T may flow through the thermal transport loop 150. The thermal transport fluid T may be cooled by the coolant C in a coolant-transport heat exchanger 152 and subsequently heated by heat transfer with a thermal load 154, where the cooled transport fluid T absorbs heat from the thermal load 154 to cool the thermal load, which also passes heat to the fluid T that can be stored in the fuel F when the fluid T and the fuel F are in thermal communication downstream of the thermal load 154. Before exchanging heat with the fuel F, the thermal transport fluid T may be further heated by heat transfer with a hot fluid H in the bus heater 158, and then the fluid T may be cooled by heat exchange with the fuel F, as the heat in the thermal transport fluid T is passed to the fuel F.

In other embodiments, a method of operating the system 100 may comprise selectively flowing a coolant C along a coolant flowpath 130, where the coolant flowpath 130 includes a cooling system 132 such that the coolant C passes through the cooling system 132 to cool the coolant C. The method may further comprise selectively flowing a fuel F along a cold fuel flowpath 110, which includes a cold fuel tank 108 for accumulating the fuel F, and passing both the coolant C and the fuel F through a fuel cooler heat exchanger 106 to cool the fuel F. The method also may include controlling the flow of the fuel F from the fuel cooler heat exchanger 106 to the cold fuel tank 108 for accumulation of the cooled fuel F. Further, the method may comprise selectively flowing a thermal transport fluid T along a thermal transport flowpath 150 and selectively flowing the fuel F along a hot fuel flowpath 120, which includes a hot fuel tank 118 for accumulating the fuel F. The method also includes passing both the thermal transport fluid T and the fuel F through a fuel heater heat exchanger 116 to heat the fuel F and controlling the flow of the fuel F from the fuel heater heat exchanger 116 to the hot fuel tank 118 for accumulation of the heated fuel F. As described herein, the cold fuel flowpath 110 is fluidly coupled to the hot fuel flowpath 120, and the fuel F recirculates through the system 100 along the cold fuel flowpath 110 and the hot fuel flowpath 120. Further, the cold fuel flowpath 110 is part of a fuel cooling loop 102 and the hot fuel flowpath 120 is part of a fuel heating loop 104, and the fuel F flows from the fuel cooling loop 102 to the fuel heating loop 104 before at least a portion of the fuel F flows to a fuel burn location 126 for consumption of the fuel F.

Although described above without reference to a specific figure, it will be appreciated that a method of operating a system 100 may be described with respect to each of the various exemplary systems 100 described herein and illustrated in the figures. That is, the method may vary according to the various embodiments of the system 100 shown in FIGS. 2-7B, but a method of operation may be understood with respect to each of the various embodiments. Generally, each method of operating the respective system 100 may include operating the fuel cooling loop 102 to store cooling capacity in the fuel F through accumulation of the fuel in the cold fuel tank 108, as well as operating the fuel heating loop 104 by flowing some of the fuel F to the fuel heating loop 104, where the fuel F is heated and immediately consumed or stored for later use. Thus, the system 100 may provide needed cooling capacity for the various thermal loads during operating conditions when a cooling system cannot supply the needed cooling capacity and/or may provide heated fuel for consumption by the vehicle and/or engine during operating conditions when heat sources cannot supply the heat needed to sufficiently raise the temperature of the fuel to improve fuel burn efficiency.

As described herein, the fuel F that enters the system 100 does not return to its source; the fuel F that enters the cold fuel flowpath 110 either recirculates through the cold fuel flowpath 110 (including flow to the cold fuel tank 108 as fuel flow $F_{Ctank}$) or flows to the hot fuel flowpath 120 (as fuel flow $F_{cool}$), where the fuel F either recirculates (including flow to the hot fuel tank 118 as fuel flow $F_{Htank}$) or flows to the fuel burn location 126 (as fuel flow $F_{burn}$). As such, the fuel flow $F_{cool}$ to the fuel heating loop 104 equals the sum of the fuel flow $F_{Htank}$ to the hot fuel tank 118 and the fuel flow $F_{burn}$ to the fuel burn location 126, i.e., the fuel F flows from the fuel cooling loop 102 to the fuel heating loop 104 such that $F_{cool}=F_{Htank}+F_{burn}$. Further, as shown, e.g., in FIGS. 2-4, at least a portion of the fuel flow $F_{source}$ from the main fuel tank 95 or deoxygenated fuel source 184 into the system 100 may be diverted by the valve 113 to the fuel heating loop 104 without passing through the cold fuel flowpath 110. As shown in the figures, the fuel flow $F_{source}$, whether diverted from the cold fuel flowpath 110 or flowing through the cold fuel flowpath 110, enters the fuel heating loop 104 as at least part of the fuel flow $F_{cool}$. Thus, a total fuel flow $F_{Ctotal}$ of the fuel cooling loop 102 is the sum of the fuel flow $F_{Ctank}$ to the cold fuel tank 108 and the fuel flow $F_{cool}$ to the fuel heating loop 104, i.e., $F_{Ctotal}=F_{Ctank}+F_{cool}$. A total fuel flow $F_{Htotal}$ of the fuel heating loop 104 is the sum of the fuel flow $F_{Htank}$ to the hot fuel tank 118 and the fuel flow $F_{burn}$ to the fuel burn location 126, i.e., $F_{Htotal}=F_{Htank}+F_{burn}$. Accordingly, a total fuel flow $F_{total}$ of the system 100 is the sum of the total fuel flow $F_{Ctotal}$, $F_{Htotal}$ of each fuel loop 102, 104, i.e., $F_{total}=Fc_{total}+F_{Htotal}$ or $F_{total}=F_{Ctank}+F_{cool}+F_{Htank}+F_{burn}$. For fuel flows within the system 100, a fuel split between fuel storage, i.e., $F_{Ctank}$, $F_{Htank}$, or both $F_{Ctank}$ and $F_{Htank}$, and $F_{burn}$ may be a 1:1 ratio, a 2:1 ratio, or any other appropriate split of the total fuel flow $F_{total}$ between fuel flow $F_{Ctank}$, $F_{Htank}$ to the respective fuel tank 108, 118 and the fuel flow $F_{burn}$ to the fuel burn location 126.

Moreover, as described herein, the cold fuel tank 108 is charged or accumulates fuel F when the cooling capacity $TC_{cool}$ exceeds the cooling load $L_{cool}$. That is, the fuel flow $F_{Ctank}$ to the cold fuel tank 108 is greater than zero (0) when the cooling capacity $TC_{cool}$ exceeds the cooling load $L_{cool}$ such that $F_{Ctank}>0$ when $TC_{cool}>L_{cool}$. Further, charging the cold fuel tank 108 means more fuel F is going to the cold fuel tank 108 than to the fuel heating loop 104, i.e., the ratio of the fuel flow $F_{Ctank}$ to the fuel flow $F_{cool}$ is greater than one (1) when the cooling capacity $TC_{cool}$ exceeds the cooling load $L_{cool}$ or $F_{Ctank}/F_{cool}>1$ when $TC_{cool}>L_{cool}$. Conversely, the cold fuel tank 108 is discharged, or cooled fuel F flows from the cold fuel tank 108, when the fuel cooling or thermal load $L_{fuel}$ exceeds the fuel cooling or thermal capacity $TC_{fuel}$. That is, the fuel flow $F_{Ctank}$ is less than zero (0), representing the fuel flow from the cold fuel tank 108, when the thermal load $L_{fuel}$ is greater than the fuel thermal capacity $TC_{fuel}$ such that $F_{Ctank}<0$ when $TC_{fuel}<L_{fuel}$. Additionally, discharging the cold fuel tank 108 means more than half or 50% of the fuel flow $F_{cool}$ is flowing from the cold fuel tank 108, i.e., the ratio of the fuel flow $F_{Ctank}$ to the fuel flow $F_{cool}$ is less than −50% (negative fifty percent, where the negative value indicates fuel flow from or out of the cold fuel tank 108) when the fuel thermal load $L_{fuel}$ exceeds the fuel thermal capacity $TC_{fuel}$, or $F_{Ctank}/F_{cool}>-0.50$ when $L_{fuel}>TC_{fuel}$. As described herein, one or more valves, such as valves 112, 113, may be modulated to control the flow of the fuel F to the cold fuel tank 108 and the fuel heating loop 104. Thus, one or more valves, e.g., valves 112, 113, may be positioned to control the fuel flow F such that $F_{Ctank}/F_{cool}>1$ when $TC_{cool}>L_{cool}$ and may be positioned to control the fuel flow F such that $F_{Ctank}/F_{cool}>-0.50$ when $L_{fuel}>TC_{fuel}$.

Additionally, as described herein, the hot fuel tank 118 is charged or accumulates fuel F when the heating capacity $HC_{heat}$ exceeds the heating demand $D_{heat}$. That is, the fuel flow $F_{Htank}$ to the hot fuel tank 118 is greater than zero (0) when the heating capacity $HC_{heat}$ exceeds the heating demand $D_{heat}$ such that $F_{Htank}>0$ when $HC_{heat}>D_{heat}$. Further, charging the hot fuel tank 118 means more fuel F is going to the hot fuel tank 118 than to the fuel burn location 126, i.e., the ratio of the fuel flow $F_{Htank}$ to the fuel flow $F_{burn}$ is greater than one (1) when the heating capacity $HC_{heat}$ exceeds the heating demand $D_{heat}$, or $F_{Htank}/F_{burn}>1$ when $HC_{heat}>D_{heat}$. Conversely, the hot fuel tank 118 is discharged, or heated fuel F flows from the hot fuel tank 118, when the heated fuel demand $D_{fuel}$ exceeds the fuel heating or thermal capacity $HC_{fuel}$. That is, the fuel flow $F_{Htank}$ is less than zero (0), representing the fuel flow from the hot fuel tank 118, when the heated fuel demand $D_{fu}e$ is greater than the fuel thermal capacity $HC_{fuel}$ such that $F_{Htank}<0$ when $HC_{fuel}<D_{fuel}$. Additionally, discharging the hot fuel tank 118 means more than half or 50% of the fuel flow $F_{burn}$ is flowing from the hot fuel tank 118, i.e., the ratio of the fuel flow $F_{Htank}$ to the fuel flow $F_{burn}$ is less than −50% (negative fifty percent, where the negative value indicates fuel flow from or out of the hot fuel tank 118) when the heated fuel demand $D_{fuel}$ exceeds the fuel thermal capacity $HC_{fuel}$, or $F_{Htank}/F_{burn}>-0.50$ when $D_{fuel}>HC_{fuel}$. As described herein, one or more valves, such as valves 122, 124 may be modulated to control the flow of the fuel F to the hot fuel tank 118 and the fuel burn location 126. Thus, one or more valves, e.g., valves 122, 124, may be positioned to control the fuel flow F such that $F_{Htank}/F_{burn}>1$ when $HC_{heat}>D_{heat}$ and may be positioned to control the fuel flow F such that $F_{Htank}/F_{burn}>-0.50$ when $D_{fuel}>HC_{fuel}$.

As further described herein, a thermal load $L_{cool}$ on the coolant loop 130 is independent of a thermal load $L_{fuel}$ on the cold fuel loop 110, e.g., the thermal loads may be oil cooling, avionics/electronics, vehicle environment control, etc. However, the thermal capacity $TC_{cool}$ of the coolant loop 130 may not be independent from the thermal capacity $TC_{fuel}$ of the cold fuel loop 110, e.g., because the engine 46 (which burns the fuel F) is also the powerplant for the vehicle 10 and provides energy or mass flow input to the coolant system 132 of the coolant loop 130. Moreover, the fuel cooling or thermal capacity $TC_{fuel}$ depends on the fuel flow $F_{cool}$ to the fuel heating loop 104 and the fuel supply temperature.

In addition, a heating demand $D_{heat}$ on the thermal transport bus loop 150 is independent of a heated fuel demand $D_{fuel}$ on the hot fuel loop 120, i.e., the heating demand $D_{heat}$ is for a flow of hot fluid H to heat the thermal transport fluid T while the heated fuel demand $D_{fuel}$ is for a flow of heated fuel $F_{burn}$ to the fuel burn location 126, e.g., for combustion in the engine 46. However, the thermal or heating capacity $HC_{heat}$ of the hot fluid H may not be independent from the thermal or heating capacity $HC_{fuel}$ of the hot fuel loop 120, e.g., because the engine 46 (which burns the fuel F) is also the powerplant for the vehicle 10 and provides energy or mass flow input to the heat source 142, which heats the thermal transport fluid T flowing in the thermal transport bus loop 150. Moreover, the fuel heating or thermal capacity $HC_{fuel}$ depends on the fuel flow $F_{burn}$ to the fuel burn location 126 (e.g., a burn flow rate of the fuel F) and the fuel supply temperature.

Further, in some embodiments, the system 100 may include a control system 200, e.g., for opening and/or closing the one or more valves 112, 122, 124, 136, 164, 168, 178, 179 that may be included in the respective configuration of the system 100 and/or for modulating a pump speed of the one or more pumps 128, 169 that may be included in the system 100. An exemplary control system 200 is illustrated in FIG. 2. It will be appreciated that any of the embodiments of the system 100 depicted in FIGS. 3-7B also may include the control system 200. Moreover, the valves 112, 122, 124, 136, 164, 168, 178, 179 and/or pumps 128, 169 may be controlled in other ways as well. For example, in appropriate embodiments, one or more of the valves 112, 122, 124, 136, 164, 168, 178, 179 may be passively actuated, e.g., by a temperature and/or pressure within the system 100 and/or external to the system 100. Thus, the one or more valves 112, 122, 124, 136, 164, 168, 178, 179 of the system 100 may be referred to as an active system (e.g., controlled by the control system 200 or other actuation system or component) or a passive system (e.g., passively actuated as described) for controlling fluid flow (e.g., the flow of the fuel F, the flow of the coolant C, the flow of the hot fluid H, and/or the flow of the thermal transport fluid T) in the system 100.

As shown in FIG. 2, the exemplary control system 200 includes a controller 202, with the controller 202 being operably connected to each of the valves 112, 122, 124 as well as the pump 128. Specifically, the controller 202 generally includes a network interface 204. The network interface 204 may be operable with any suitable wired or wireless communications network for communicating data with other components of, e.g., the TMS 100, the engine 46, and/or other components or systems not depicted. As is illustrated using phantom lines, for the exemplary embodiment of FIG. 2, the network interface 204 utilizes a wireless communication network 206 to communicate data with other components. More particularly, through the network interface 204 of the controller 202 and the wireless communication network 206, the controller 202 may be operably coupled to each of the one or more valves 112, 122, 124, 136, 164, 168, 178, 179 and/or pumps 128, 169 included in the particular embodiment of the system 100. It will be appreciated, of course, that although the network interface 204 utilizes the wireless communication network 206 for the exemplary embodiment of FIG. 2, in other embodiments, the network interface 204 may instead utilize a wired communication network or a combination of wired and wireless communication networks.

Referring still to FIG. 2, the controller 202 further includes one or more processors 208 and memory 210. The memory 210 stores data 212 and instructions 214 accessible by the one or more processors 208. The one or more processor(s) 52 can include any suitable processing device, such as a microprocessor, microcontroller, integrated circuit, logic device, and/or other suitable processing device. The one or more memory device(s) 210 can include one or more computer-readable media, including, but not limited to, non-transitory computer-readable media, RAM, ROM, hard drives, flash drives, and/or other memory devices. The instructions 214, when executed by the one or more processors 208, cause the control system 200 to perform functions. The instructions 214 within the memory 210 can be any set of instructions that, when executed by the one or more processors 208, cause the one or more processors 208 to perform operations, such as one or more of the operations described herein. In certain exemplary embodiments, the instructions 214 within the memory 210 can be software written in any suitable programming language or can be implemented in hardware. Additionally and/or alternatively, the instructions can be executed in logically and/or virtually separate threads on processors 208. The memory devices 210 can further store other data 214 that can be accessed by the processors 208.

In such a manner, it will be appreciated that in at least certain exemplary embodiments, the controller 202 may be configured to receive data from one or more sensors and/or components and may control operations of the TMS 100 in response to the data received from the one or more sensors and/or components. For example, the exemplary controller 202 may be configured to operate the refrigerant switching valve 136 in response to data received from a coolant-cooled thermal load 134 and/or a fuel-cooled thermal load 114 (e.g., increase a flow of coolant C to the coolant-cooled thermal load 134 in response to receiving data indicative of an increased cooling demand by the coolant-cooled thermal load 134). Additionally and/or alternatively, the exemplary controller 202 may be configured to operate the fuel pump 128 in response to receiving data indicative of a fuel flow needed at the fuel burn location 126. The controller 202 may use other data to control the one or more valves and/or one or more pumps of the particular configuration of the system 100, with various exemplary configurations of the system 100 illustrated in FIGS. 2-7B.

In some embodiments, the control system 200 and/or the controller 202 may be part of automated digital controls (e.g., a Full Authority Digital Engine Control (FADEC) on an aircraft) that control one or more aspects of an engine, such as engine 46. For example, the controller 202 may be, e.g., an Electronic Engine Controller (EEC) or Electronic Control Unit (ECU) of a FADEC, and in addition to the functions described herein, may control fuel flow, engine geometries, and other parameters to optimize performance of the engine 46 during operation, such as during takeoff, flight, and landing for an aircraft. Various parameters, such as the state of flight, state of aircraft systems, and pilot commands, may be communicated using digital signals from a system, such as an avionics system, to the controller 202. As described herein, the controller 202 may include various components for performing various operations and functions, such as the one or more processors 208 and one or more memory devices 210. In other embodiments, the controller 202 may perform the specific functions described herein, and one or more other controllers may control various parameters to optimize performance of the engine 46 other than those specific functions. Thus, the control system 200 (e.g., an aircraft controller, FADEC, or the like) may control the storage or depletion of thermal energy in the system 100 by controlling the accumulation and distribution of cooled and heated fuel F as described herein.

It will be appreciated that the blocks 114, 134, 154 shown in the figures (and described as thermal loads) may represent heat exchangers. For example, the fuel-cooled thermal load 114 shown disposed in the fuel cooling loop 102 may be a fuel-cooled load heat exchanger for cooling one or more thermal loads by the exchange of heat between the fuel F and a fluid of the thermal load. More particularly, the block 114 in the figures may represent the fuel F cooling a thermal load via heat exchange between the cooler or cold fuel F and the warmer or hot thermal load. Similarly, the block 134 may represent the coolant C cooling a thermal load via heat exchange between the cooler or cold coolant C and the warmer or hot thermal load, and the block 154 may represent the thermal transport fluid T cooling a thermal load via heat exchange between the cooler or cold thermal transport fluid T and the warmer or hot thermal load. Accordingly, while each of the blocks 114, 134, 154 may be referred to as a thermal load, the blocks 114, 134, 154 may represent heat exchangers for the exchange of heat between the respective fluid (fuel F, coolant C, thermal transport fluid T) and another fluid that is warmer or hotter than the respective fluid F, C, T.

Further, it will be appreciated that the fuel F may be any suitable or appropriate fuel, e.g., for use in the engine 46 and/or vehicle 10. For example, in some embodiments, the fuel may be jet fuel or jet propellant (JP). In further embodiments, the fuel may be cryogenic or near-cryogenic, e.g., when the engine 100 is a hypersonic propulsion engine and/or the vehicle 46 is a hypersonic vehicle.

Further, the coolant C may be any suitable or appropriate coolant for use in the cooling system 132. For example, the cooling system 132 module of the system 100 may be a refrigeration cycle, and the coolant C may be a refrigerant. In other embodiments, as described herein, the system 100 may be an open system utilizing air, such as bleed air from the engine 46 and/or vehicle 10, as the coolant C in the cooling system 132, and the air coolant may enter the system 100 and be exhausted from the system 100 rather than continuously cycling through the system 100 in a coolant flowpath loop 130.

Moreover, in some embodiments, the working fluids—the coolant C and the thermal transport fluid T—used in the system 100 may depend on the fuel F and/or each other, e.g., a certain coolant C may be selected for use in the coolant-transport heat exchanger 152 with a certain thermal transport fluid T. Generally, each working fluid, i.e., each of the coolant C and the thermal transport fluid T (when used in the system 100), may be an inert fluid, e.g., to enable a layer of redundancy in the system 100, protecting against a volatile mix of the fuel F and working fluid C, T flowing in the respective coolant flowpath 130 and thermal transport flowpath 150. Example working fluids C, T may include, but are not limited to, the following: thermal oils; supercritical fluids such as supercritical carbon dioxide ($sCO_2$); liquid metals; standard industry refrigerants (R-###ANSI/ASHRAE designation), e.g., R-410a; and noble gases, which also carry refrigerant designations. As an example, where the fuel F is liquid hydrogen fuel (LH2 or the refrigerant designation R-702), the coolant C and/or thermal transport fluid T may be helium (R-704) or neon (R-720) and, more particularly, may be supercritical helium, subcooled liquid neon, transcritical neon, or supercritical neon. As another example, where the fuel F is methane (R-50), the coolant C and/or thermal transport fluid T may be nitrogen (R-728), argon (R-740), or krypton (R-784). More particularly, the working fluid C, T in the respective coolant flowpath 130 and thermal transport flowpath 150 may be transcritical or supercritical nitrogen, transcritical or supercritical argon, or subcooled liquid krypton, transcritical krypton, or supercritical krypton. As yet another example, where the fuel F is jet fuel or jet propellant (JP), the coolant C and/or thermal transport fluid T may be pentafluoroethane (R-410a) fire extinguishing media, a near azeotropic mixture of difluoromethane (R-32) and pentafluoroethane (R-125), carbon dioxide ($CO_2$ or R-744), or a binary gas compound, such as xenon plus another gas. More particularly, the coolant C and/or thermal transport fluid T may be supercritical pentafluoroethane or supercritical carbon dioxide ($sCO_2$). Further, a fire-suppressing working fluid C, T, such as supercritical carbon dioxide, may be selected for fuel inerting or for otherwise suppressing a fire in the event of a leak or other failure in which the fuel F and working fluid C, T could come into contact or mix together. Other working fluids C, T for use in the respective flowpath 102, 126 may be used as well.

Moreover, it will be appreciated that, although described with respect to the vehicle 10 and gas turbine engine 46, the thermal management system 100 described herein may have other applications. That is, the system 100 is not limited to use with a gas turbine engine and/or a vehicle such as an aircraft. For example, in some embodiments, the TMS 100 may be incorporated into any other suitable aeronautical propulsion system, such as a hypersonic propulsion system, a turbofan engine, a turboshaft engine, a turboprop engine, a turbojet engine, a ramjet engine, a scramjet engine, etc., or combinations thereof, such as combined-cycle propulsion systems. Further, in certain embodiments, the TMS 100 may be incorporated into a non-aeronautical propulsion system, such as a land-based power-generating propulsion system, an aero-derivative propulsion system, etc. Further still, in certain embodiments, the TMS 100 may be incorporated into any other suitable propulsion system or vehicle, such as a manned or unmanned aircraft, etc.

Accordingly, the present subject matter provides systems and methods utilizing heat exchange between at least one working fluid and a fuel to accumulate cooled fuel and to accumulate heated fuel. For example, the present subject matter provides a single regenerative system chills fuel to extend fuel-cooled load thermal capacity, heats the fuel with low-temperature heat sources, then drives up the fuel temperature with additional vehicle and/or engine heat loads to maximum temperature-dependent deoxygenated fuel benefit. Exemplary systems and methods described herein simultaneously recirculate cold fuel for thermal management system (TMS) cooling capacity and hot fuel for engine or propulsive efficiency. Stated differently, exemplary systems and methods utilize a combined regenerative fuel cooling loop and regenerative fuel heating loop that is operated to maintain both a cold fuel tank as a thermal reservoir for fuel-cooled loads and a hot fuel tank as a high-temperature reservoir for supplying heated fuel to a fuel burn location, e.g., supplying heated deoxygenated fuel to an engine combustor. Operation of such systems may be substantially independent of vehicle TMS demand and engine power; for instance, an exemplary system may be operated to chill fuel and/or heat fuel depending on cooling system and heat source capacities. As such, the systems described herein may effectively decouple power/thermal management system (PTMS) loads from engine thermal management while also increasing fuel-cooled thermal load capacity. In some embodiments, a single thermal transport bus unites both cold and hot fuel loops with recuperation potential, which may improve the efficiency of the system.

As described herein, the cooled fuel is an accumulation of cooling capacity in the fuel, e.g., during periods of relatively high cooling generation and relatively low cooling demand, and the cooling capacity stored in the fuel may be extracted from the fuel, e.g., during periods of relatively low cooling generation and relatively high cooling demand. For instance, a TMS of an aircraft may be configured such that extra cooling capacity, available when a main thermal load cooling demand is relatively low and fan duct cooling capacity (i.e., bleed air cooling capacity) is relatively high, is off-loaded to a fuel tank or vessel, effectively using the aircraft fuel for thermal energy storage. Further, the TMS may incorporate a cooling system that is tied to, e.g., an operating condition of an engine (e.g., engine power, etc.) such that the cooling capacity of the cooling system varies, and the variable cooling capacity may not correspond to the cooling demand of one or more systems cooled via the TMS. The embodiments of the TMS described herein thus capture the cooling capacity of the cooling system when the cooling capacity is readily available and store the cooling capacity for use when the cooling capacity is not as readily available yet the cooling demand is relatively high. As such, any excess cooling capacity may be used for cooling a fuel tank or vessel rather than trying to balance heat generation and heat sink capacities in a steady state sense (e.g., instead of balancing aircraft heat generation and engine heat sink capacities).

In some embodiments, thermal transport capacity may be reduced by shifting loads otherwise cooled by the thermal transport or bus loop to the fuel system. More particularly, compared to a typical allocation of heat loads between transport- or bus-cooled loads and fuel-cooled loads, more loads may be cooled by the fuel flowing through the fuel flowpath of the TMS described herein. Thus, less or reduced cooling capacity may be required by the thermal transport flowpath, which may increase the efficiency of the system, reduce the complexity of the system, etc. Additionally or alternatively, the exemplary systems described herein may extend fuel-cooled architecture on the lower end to increase capacity for lower temperature heat generation.

As described herein, the cooling system may utilize air, a refrigerant, supercritical carbon dioxide ($sCO_2$), etc. as a coolant. The cooling system may be either an open or a closed loop; a closed loop may provide more constant capacity operation and may not require moisture management, but an open loop may be useful for some embodiments, such as when it is desirable to use air as the coolant.

The cooling system may run or be operated whenever possible, e.g., to keep cooling the fuel such that more heat may be transferred to or put into the fuel during periods of high cooling demand.

As further described herein, the cold fuel tank to which the excess cooling capacity is offloaded may function as accumulator for local fuel return within the TMS, may be an auxiliary TMS tank downstream of a "main" fuel tank (e.g., an aircraft fuel tank), or may be the "main" fuel tank itself. Thus, the cold fuel tank of the TMS may be a TMS vessel or may be the fuel source of an engine and/or vehicle in which the TMS is used. Moreover, the systems described herein, utilizing fuel as a heat storage mechanism, provide a regenerative TMS solution that takes advantage of an available heat sink. As such, an additional thermal energy storage system, such as wax or liquid metal, can be avoided or eliminated, which also eliminates drawbacks associated with such systems, e.g., wax would require too much volume to be a viable thermal energy storage system and liquid metals are heavy and corrosive.

Additionally, another benefit or advantage of the systems described herein is that the fuel flowpath or fuel loop may be designed with a rapid transient response capability. For example, to help cool mission systems of an aircraft, the cold fuel flowpath transient may be designed to exceed the time constant for an air cycle machine (ACM), such as an air-based refrigerator. Further, it will be appreciated that the systems described herein may effectively leverage existing systems to get chilled fuel in operation. Colder fuel may improve dynamic temperature response during quick deceleration or chops, which risk exceeding the effective, stable, or operational temperature limits of the fuel because metal components of the fuel system are still hot, and may offset fuel pump heat generation. Moreover, colder fuel may provide soak-back thermal management functionality to reduce and/or prevent fuel nozzle coking or the like, e.g., by burning cooled fuel through landing, taxi, and shutdown of an aircraft, when airflow cooling streams are reduced and/or stopped but the metal components of the fuel system remain hot. What is more, additional thermal lag can aid fuel dynamics, e.g., by preventing a small or reduced fuel flow from overheating during engine chop. Thus, the present subject matter provides benefits and advantages with respect to various thermal transient issues that may be encountered in an engine and/or a vehicle, such as an aircraft, in which the system may be used.

Further, through thermal transfer between a hot fluid, i.e., the fluid providing the fuel heating capacity, and the fuel, the systems and methods described herein also may provide a cooling benefit by cooling the hot fluid, which may then be used for cooling one or more other systems or components. For instance, where the hot fluid is engine bleed air for turbine cooling, the systems and methods described herein may provide a cooled cooling air benefit, as a result of heating the fuel to provide heated fuel for consumption by the engine.

Moreover, the systems and methods described herein provide a fuel heating loop that regeneratively stores heat, e.g., engine and/or vehicle heat, in fuel stored in a fuel accumulator or tank of the fuel system (which may be an intermediate fuel tank of the engine and/or vehicle) such that the heat stored in the fuel can be discharged back to a burn flow, e.g., to optimize a hot or heated fuel specific fuel consumption (SFC) benefit. That is, the systems and methods described herein may provide a hot fuel benefit at low-power or cruise-type conditions using heat stored during high-power or take-off-type conditions. For example, a typical aircraft mission seeks to optimize fuel burn at lower power (e.g., cruise), but the aircraft engine heat rejection is highest at power (e.g., take off) such that there is a continual mismatch between fuel heating potential and hot fuel demand. Heated fuel regeneration as described herein provides a solution to the mismatch, as heated fuel may be stored in, e.g., an intermediate hot fuel tank local to the engine and/or TMS instead of fuel return to tank (e.g., the main fuel tank). Additionally, known Brayton cycle thermal loops attempt to sufficiently heat fuel to a desired fuel temperature using multiple bleed air coolers and core flow path waste heat recovery to heat a thermal transport bus for heat transfer with the fuel. In contrast, the systems and methods described herein may eliminate heat exchange systems that only operate over specific aircraft mission legs, as well as provide heated fuel when the bleed air cooler provides reduced cooling at lower power operating conditions. Further, as described with respect to the fuel cooling loop of the present subject matter, the systems and methods herein may be advantageous compared to typical thermal energy storage media, such as wax, liquid metals, and fusible alloys, which do not have sufficient power density and/or are too corrosive or toxic. Utilizing the fuel as a regenerative storage medium, as described herein, may overcome both these problems, providing a thermal energy storage medium that is sufficiently power dense as well as less corrosive and toxic.

Moreover, the systems and methods described herein may be implemented with a thermal transport bus or without; for example, direct fuel-air heat exchange is possible in embodiments of the systems and methods described herein. Still further, the present subject matter provides embodiments combining the cold fuel tank and fuel cooler into a single component and/or combining the hot fuel tank and fuel heater into a single component, either or both of which may simplify the thermal management system (e.g., requiring less space and/or fewer parts) and/or allow additional fuel cooling and/or heating as part of a closed system. Moreover, the bus cooler and transport-fuel (or bus-fuel) heat exchangers described herein may be regenerative heat exchangers that store additional thermal energy, increasing the capacity and/or efficiency of the exemplary systems.

Other benefits and advantages of the systems described herein also may occur to those having ordinary skill in the art.

Further aspects of the invention are provided by the subject matter of the following clauses:

1. A system comprising a fuel cooling loop including a cold fuel flowpath having a fuel flowing therethrough, a fuel cooler heat exchanger for cooling the fuel, the fuel cooler heat exchanger in fluid communication with the cold fuel flowpath, and a cold fuel tank disposed along the cold fuel flowpath for accumulating at least a portion of the cooled fuel; and a fuel heating loop including a hot fuel flowpath for a flow of the fuel, a fuel heater heat exchanger for heating the fuel, the fuel heater heat exchanger in fluid communication with the hot fuel flowpath, and a hot fuel tank disposed along the hot fuel flowpath for accumulating at least a portion of the heated fuel, wherein the fuel cooling loop is coupled to the fuel heating loop such that the fuel circulates through both the fuel cooling loop and the fuel heating loop.

2. The system of any preceding clause, wherein a fuel connector line fluidly couples the cold fuel flowpath and the hot fuel flowpath.

3. The system of any preceding clause, further comprising a fuel pump disposed along the fuel connector line for driving the fuel from the cold fuel flowpath to the hot fuel flowpath.

4. The system of any preceding clause, further comprising a coolant flowpath having a coolant flowing therethrough and a cooling system for cooling the coolant, wherein the fuel cooler heat exchanger is in fluid communication with both the coolant flowpath and the cold fuel flowpath for heat exchange between the coolant and the fuel.

5. The system of any preceding clause, further comprising a first heat source for providing a flow of a first hot fluid, wherein the fuel heater heat exchanger is in fluid communication with both the flow of the first hot fluid and the hot fuel flowpath for heat transfer between the first hot fluid and the fuel.

6. The system of any preceding clause, further comprising a thermal transport flowpath having a thermal transport fluid flowing therethrough, the thermal transport flowpath extending in a closed loop through both the fuel cooling loop and the fuel heating loop; and a recuperator disposed along the thermal transport flowpath.

7. The system of any preceding clause, further comprising a thermal transport flowpath having a thermal transport fluid flowing therethrough, the thermal transport flowpath extending in a closed loop through both the fuel cooling loop and the fuel heating loop, wherein the fuel heater heat exchanger is in fluid communication with both the thermal transport flowpath and the hot fuel flowpath.

8. The system of any preceding clause, further comprising a bus cooler heat exchanger disposed downstream of the fuel heater heat exchanger, the bus cooler heat exchanger in fluid communication with both a cooling source and the thermal transport flowpath to cool the thermal transport fluid upstream of the fuel cooling loop.

9. The system of any preceding clause, further comprising a first heat source for providing a flow of a first hot fluid; a second heat source for providing a flow of a second hot fluid; a thermal transport flowpath having a thermal transport fluid flowing therethrough, the thermal transport flowpath extending in a closed loop through both the fuel cooling loop and the fuel heating loop; an intermediate bus heater heat exchanger, the intermediate bus heater heat exchanger in fluid communication with both the second heat source and the thermal transport flowpath to heat the thermal transport fluid; and a bus heater heat exchanger, the bus heater heat exchanger in fluid communication with both the first heat source and the thermal transport flowpath downstream of the intermediate bus heater heat exchanger to heat the thermal transport fluid.

10. The system of any preceding clause, further comprising a first heat source modulation valve disposed between the first heat source and the bus heater heat exchanger for controlling the flow of the first hot fluid; and a second heat source modulation valve disposed between the second heat source and the intermediate bus heater heat exchanger for controlling the flow of the second hot fluid.

11. The system of any preceding clause, further comprising a bus cooler heat exchanger in fluid communication with both the thermal transport flowpath downstream of the fuel heater heat exchanger and a cooling source to cool the thermal transport fluid, wherein the fuel heater heat exchanger is in fluid communication with both the thermal transport flowpath and the hot fuel flowpath.

12. The system of any preceding clause, wherein the fuel is used to cool a thermal load upstream of the fuel heating loop.

13. The system of any preceding clause, further comprising a cold fuel recirculation valve disposed in the cold fuel flowpath, wherein the cold fuel recirculation valve is configured to modulate the flow of fuel between the cold fuel tank and the fuel heating loop.

14. The system of any preceding clause, further comprising a hot fuel recirculation valve disposed in the hot fuel flowpath, wherein the fuel is configured to flow to a fuel burn location downstream from the fuel heating loop, and wherein the hot fuel recirculation valve is configured to modulate the flow of fuel between the hot fuel tank and the fuel burn location.

15. The system of any preceding clause, wherein the fuel is a deoxygenated fuel.

16. The system of any preceding clause, wherein the fuel cooler heat exchanger and the cold fuel tank are a single component.

17. The system of any preceding clause, wherein the fuel heater heat exchanger and the hot fuel tank are a single component.

18. A method of operating a system comprising selectively operating a fuel cooling loop in thermal communication with a cooling system to cool a fuel flowing through the fuel cooling loop and to accumulate the cooled fuel in a cold fuel tank; selectively operating the fuel cooling loop to cool a fuel-cooled thermal load with the cooled fuel and flow the fuel to a fuel heating loop; selectively operating the fuel heating loop in thermal communication with a heat source to heat the fuel flowing through the fuel heating loop and to accumulate the heated fuel in a hot fuel tank; and selectively operating the fuel heating loop to flow at least a portion of the fuel to a fuel burn location for consumption of the fuel and to recirculate a remaining portion of the fuel through the fuel heating loop.

19. The method of any preceding clause, wherein a cold fuel recirculation valve is disposed in the fuel cooling loop for selectively operating the fuel cooling loop, and wherein a hot fuel recirculation valve is disposed in the fuel heating loop for selectively operating the fuel heating loop.

20. The method of any preceding clause, wherein a fuel heater valve is disposed in the fuel heating loop for selectively operating the fuel heating loop to accumulate the heated fuel in the hot fuel tank.

21. The method of any preceding clause, further comprising selectively operating one or more valves to control a flow of the heated fuel between a flow $F_{Htank}$ of the fuel to the hot fuel tank and a flow $F_{burn}$ of the fuel to the fuel burn location, wherein the fuel has a heating capacity $HC_{fuel}$ and the fuel burn location has a heating demand $D_{fuel}$, and wherein the flow of the fuel is controlled such that $F_{Htank}/F_{burn} < -0.50$ when $D_{fuel} > HC_{fuel}$.

22. The method of any preceding clause, further comprising selectively operating a thermal transport loop in thermal communication with both a transport-cooled load and the heat source such that the thermal transport loop cools the transport-cooled thermal load and heats the fuel; and selectively operating one or more valves to control a flow of the heated fuel between a flow $F_{Htank}$ of the fuel to the hot fuel tank and a flow $F_{burn}$ of the fuel to the fuel burn location, wherein the hot fluid has a heating capacity $HC_{heat}$ and the thermal transport loop has a heating demand $D_{heat}$, and wherein the flow of the fuel is controlled such that $F_{Htank}/F_{burn} > 1$ when $HC_{heat} > D_{heat}$.

23. The method of any preceding clause, further comprising selectively operating one or more valves to control a flow of the cooled fuel between a flow $F_{Ctank}$ of the fuel to the cold fuel tank and a flow $F_{cool}$ of the fuel to the fuel heating loop, wherein the cooling system utilizes a coolant flowing along a coolant flowpath to cool the fuel, the coolant having a thermal capacity $TC_{cool}$ and the fuel having a thermal capacity $TC_{fuel}$, wherein the fuel cooling loop includes a coolant-cooled thermal load $L_{cool}$ cooled by the coolant and a fuel-cooled thermal load $L_{fuel}$ cooled by the fuel, wherein the flow of the fuel is controlled such that $F_{Ctank}/F_{cool} > 1$ when $TC_{cool} > L_{cool}$.

24. The method of any preceding clause, further comprising selectively operating one or more valves to control a flow of the cooled fuel between a flow $F_{Ctank}$ of the fuel to the cold fuel tank and a flow $F_{cool}$ of the fuel to the fuel heating loop, wherein the cooling system utilizes a coolant flowing along a coolant flowpath to cool the fuel, the coolant having a thermal capacity $TC_{cool}$ and the fuel having a thermal capacity $TC_{fuel}$, wherein the fuel cooling loop includes a coolant-cooled thermal load $L_{cool}$ cooled by the coolant and a fuel-cooled thermal load $L_{fuel}$ cooled by the fuel, wherein the flow of the fuel is controlled such that $F_{Ctank} F_{cool} > -0.50$ when $TC_{cool} > L_{cool}$.

25. A system, comprising a cold fuel tank for accumulating a fuel; a hot fuel tank for accumulating the fuel at a temperature greater than a temperature of the fuel in the cold fuel tank; and a thermal transport flowpath in thermal communication with both the cold fuel tank and the hot fuel tank, wherein the fuel flows along a flowpath to fluidly connect the cold fuel tank and the hot fuel tank.

26. The system of any preceding clause, further comprising a coolant flowpath containing a coolant having a thermal capacity $TC_{cool}$, the coolant flowpath including a cooling system configured to cool the coolant and a coolant-cooled thermal load $L_{cool}$; a cold fuel flowpath for the fuel to flow therealong, the fuel having a thermal capacity $TC_{fuel}$, the cold fuel flowpath including the cold fuel tank and a fuel-cooled thermal load $L_{fuel}$; a coolant-fuel heat exchanger in thermal communication with the fuel and coolant such that heat flows from the fuel to the coolant to cool the fuel; and an active or passive system configured to control a flow $F_{Ctank}$ of the fuel from the coolant-fuel heat exchanger to the cold fuel tank for accumulation of the cooled fuel and a flow $F_{cool}$ of the fuel to a hot fuel flowpath such that $F_{Ctank}/F_{cool} > 1$ when $TC_{cool} > L_{cool}$ and $F_{Ctank}/F_{cool} > -0.50$ when $L_{fuel} > TC_{fuel}$.

27. The system of any preceding clause, further comprising a heat source providing a hot fluid having a heating capacity $HC_{heat}$; a thermal transport fluid flowing along the thermal transport flowpath, the thermal transport fluid in thermal communication with the hot fluid such that heat flows from the hot fluid to the thermal transport fluid to heat the thermal transport fluid, the thermal transport fluid placing a heating demand $D_{heat}$ on the heat source; a fuel heater heat exchanger in thermal communication with the fuel and the thermal transport fluid such that heat flows from the thermal transport fluid to the fuel to heat the fuel; a hot fuel flowpath for the fuel to flow therealong, the fuel having a heating capacity $HC_{fuel}$, the hot fuel flowpath including the hot fuel tank; and an active or passive system configured to control a flow $F_{Htank}$ of the fuel from the fuel heater heat exchanger to the hot fuel tank for accumulation of the heated fuel and a flow $F_{burn}$ of the fuel to a fuel burn location such that $F_{Htank} F_{burn} > 1$ when $HC_{heat} > D_{heat}$ and $F_{Htank} F_{burn} < -0.50$ when $D_{fuel} > HC_{fuel}$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system, comprising:
   a fuel cooling loop including
      a cold fuel flowpath having a fuel flowing therethrough,
      a fuel cooler heat exchanger for cooling the fuel, the fuel cooler heat exchanger in fluid communication with the cold fuel flowpath, and
      a cold fuel tank disposed along the cold fuel flowpath for accumulating at least a portion of the cooled fuel;
   a fuel heating loop including
      a hot fuel flowpath having the fuel flowing therethrough,
      a fuel heater heat exchanger for heating the fuel, the fuel heater heat exchanger in fluid communication with the hot fuel flowpath, and
      a hot fuel tank disposed along the hot fuel flowpath for accumulating at least a portion the of heated fuel; and
   a thermal transport flowpath having a thermal transport fluid flowing therethrough, the thermal transport flowpath extending in a closed loop through both the fuel cooling loop and the fuel heating loop,
   wherein the fuel cooling loop is coupled to the fuel heating loop such that the fuel circulates through both the fuel cooling loop and the fuel heating loop.

2. The system of claim 1, wherein a fuel connector line fluidly couples the cold fuel flowpath and the hot fuel flowpath.

3. The system of claim 2, further comprising:
   a fuel pump disposed along the fuel connector line for driving the fuel from the cold fuel flowpath to the hot fuel flowpath.

4. The system of claim 1, further comprising:
   a coolant flowpath having a coolant flowing therethrough and a cooling system for cooling the coolant,
   wherein the fuel cooler heat exchanger is in fluid communication with both the coolant flowpath and the cold fuel flowpath for heat exchange between the coolant and the fuel.

5. The system of claim 1, further comprising:
   a first heat source for providing a flow of a first hot fluid,
   wherein the fuel heater heat exchanger is in fluid communication with both the flow of the first hot fluid and the hot fuel flowpath for heat transfer between the first hot fluid and the fuel.

6. The system of claim 1, further comprising:
   a recuperator disposed along the thermal transport flowpath.

7. The system of claim 1,
   wherein the fuel heater heat exchanger is in fluid communication with both the thermal transport flowpath and the hot fuel flowpath.

8. The system of claim 1, further comprising:
   a bus cooler heat exchanger disposed downstream of the fuel heater heat exchanger, the bus cooler heat exchanger in fluid communication with both a cooling source and the thermal transport flowpath to cool the thermal transport fluid upstream of the fuel cooling loop.

9. The system of claim 1, further comprising:
a first heat source for providing a flow of a first hot fluid;
a second heat source for providing a flow of a second hot fluid;
an intermediate bus heater heat exchanger, the intermediate bus heater heat exchanger in fluid communication with both the second heat source and the thermal transport flowpath to heat the thermal transport fluid; and
a bus heater heat exchanger, the bus heater heat exchanger in fluid communication with both the first heat source and the thermal transport flowpath downstream of the intermediate bus heater heat exchanger to heat the thermal transport fluid.

10. The system of claim 9, further comprising:
a first heat source modulation valve disposed between the first heat source and the bus heater heat exchanger for controlling the flow of the first hot fluid; and
a second heat source modulation valve disposed between the second heat source and the intermediate bus heater heat exchanger for controlling the flow of the second hot fluid.

11. The system of claim 9, further comprising:
a bus cooler heat exchanger in fluid communication with both the thermal transport flowpath downstream of the fuel heater heat exchanger and a cooling source to cool the thermal transport fluid.

12. The system of claim 1, wherein the fuel is used to cool a thermal load upstream of the fuel heating loop.

13. The system of claim 1, further comprising:
a cold fuel recirculation valve disposed in the cold fuel flowpath,
wherein the cold fuel recirculation valve is configured to modulate a flow of the fuel between the cold fuel tank and the fuel heating loop.

14. The system of claim 1, further comprising:
a hot fuel recirculation valve disposed in the hot fuel flowpath,
wherein the heated fuel is configured to flow to a fuel burn location downstream from the fuel heating loop, and
wherein the hot fuel recirculation valve is configured to modulate the flow of the heated fuel between the hot fuel tank and the fuel burn location.

15. The system of claim 1, wherein the fuel is a deoxygenated fuel.

16. A method of operating a system, the system comprising:
a fuel cooling loop including
a cold fuel flowpath having a fuel flowing therethrough,
a fuel cooler heat exchanger for cooling the fuel, the fuel cooler heat exchanger in fluid communication with the cold fuel flowpath, and
a cold fuel tank disposed along the cold fuel flowpath for accumulating at least a portion of the cooled fuel;
a fuel heating loop including
a hot fuel flowpath having the fuel flowing therethrough,
a fuel heater heat exchanger for heating the fuel, the fuel heater heat exchanger in fluid communication with the hot fuel flowpath, and
a hot fuel tank disposed along the hot fuel flowpath for accumulating at least a portion of the heated fuel; and
a thermal transport flowpath having a thermal transport fluid flowing therethrough, the thermal transport flowpath extending in a closed loop through both the fuel cooling loop and the fuel heating loop,
wherein the fuel cooling loop is coupled to the fuel heating loop such that the fuel circulates through both the fuel cooling loop and the fuel heating loop;
the method comprising:
selectively operating the fuel cooling loop to cool the fuel flowing through the fuel cooling loop and to accumulate the at least a portion of the cooled fuel in the cold fuel tank;
selectively operating the fuel cooling loop to cool a fuel-cooled thermal load with the cooled fuel, thereby warming the cooled fuel, and flow the warmed fuel to the fuel heating loop;
selectively operating the fuel heating loop to further heat the fuel flowing through the fuel heating loop and to accumulate the at least a portion of the heated fuel in the hot fuel tank; and
selectively operating the fuel heating loop to flow at least another portion of the heated fuel to a fuel burn location for consumption of the another portion of the heated fuel and to recirculate a remaining portion of the heated fuel through the fuel heating loop.

17. The method of claim 16, wherein a cold fuel recirculation valve is disposed in the fuel cooling loop for selectively operating the fuel cooling loop, and wherein a hot fuel recirculation valve is disposed in the fuel heating loop for selectively operating the fuel heating loop.

18. The method of claim 16, further comprising:
selectively operating the thermal transport loop in thermal communication with both a transport-cooled thermal load and a heat source providing a flow of a hot liquid such that the thermal transport loop cools the transport-cooled thermal load and heats the fuel; and
selectively operating one or more valves to control a flow of the heated fuel between a flow $F_{Htank}$ of the heated fuel to the hot fuel tank and a flow $F_{burn}$ of the heated fuel to the fuel burn location,
wherein the hot fluid has a heating capacity $HC_{heat}$ and the thermal transport loop has a heating demand $D_{heat}$,
wherein the flow of the fuel is controlled such that $F_{Htank}/F_{burn} > 1$ when $HC_{heat} > D_{heat}$,
wherein the fuel has a heating capacity $HC_{fuel}$ and the fuel burn location has a heating demand $D_{fuel}$, and
wherein the flow of the heated fuel is controlled such that $F_{Htank}/F_{burn} < -0.50$ when $D_{fuel} > HC_{fuel}$.

19. The method of claim 16, further comprising:
selectively operating one or more valves to control a flow of the cooled fuel between a flow $F_{Ctank}$ of the cooled fuel to the cold fuel tank and a flow $F_{cool}$ of the cooled fuel to the fuel heating loop,
wherein the fuel cooler heat exchanger utilizes a coolant flowing along a coolant flowpath to cool the fuel, the coolant having a thermal capacity $TC_{cool}$ and the fuel having a thermal capacity $TC_{fuel}$,
wherein the fuel cooling loop includes a coolant-cooled thermal load $L_{cool}$ cooled by the coolant and a fuel-cooled thermal load $L_{fuel}$ cooled by the fuel,
wherein the flow of the cooled fuel is controlled such that $F_{Ctank}/F_{cool}$ when $TC_{cool} > L_{cool}$ and $F_{Ctank}/F_{cool} > -0.50$ when $L_{fuel} > TC_{fuel}$.

20. The system of claim 1, wherein the fuel has a thermal capacity $TC_{fuel}$, and further comprising:
a coolant flowpath containing a coolant having a thermal capacity $TC_{cool}$, the coolant flowpath in fluid communication with the fuel cooler heat exchanger such that heat flows from the fuel to the coolant to cool the fuel, the coolant flowpath including a cooling system configured to cool the coolant and a coolant-cooled thermal load $L_{cool}$;

a fuel-cooled thermal load $L_{fuel}$ disposed along the cold fuel flowpath; and one or more valves configured to control a flow $F_{Ctank}$ of the cooled fuel from the fuel cooler heat exchanger to the cold fuel tank for accumulation of the cooled fuel and a flow $F_{cool}$ of the cooled fuel to a hot fuel flowpath such that $F_{Ctank}/F_{cool}>1$ when $TC_{cool}>L_{cool}$ and $F_{Ctank}/F_{cool}>-0.50$ when $L_{fuel}>TC_{fuel}$.

21. The system of claim 1, wherein the fuel has a heating capacity $HC_{fuel}$, and further comprising:

a heat source providing a flow of a hot fluid having a heating capacity $HC_{heat}$, the thermal transport fluid in thermal communication with the hot fluid such that heat flows from the hot fluid to the thermal transport fluid to heat the thermal transport fluid, the thermal transport fluid placing a heating demand $D_{heat}$ on the heat source, the thermal transport flowpath in fluid communication with the fuel heater heat exchanger such that heat flows from the thermal transport fluid to the fuel to heat the fuel; and one or more valves configured to control a flow $F_{Htank}$ of the heated fuel from the fuel heater heat exchanger to the hot fuel tank for accumulation of the heated fuel and a flow $F_{burn}$ of the heated fuel to a fuel burn location such that $F_{Htank}/F_{burn}>1$ when $HC_{heat}>D_{heat}$ and $F_{Htank}/F_{burn}<-0.50$ when $D_{fuel}>HC_{fuel}$.

22. A system, comprising:

a fuel cooling loop including
  a cold fuel flowpath having a fuel flowing therethrough, the fuel having a heating capacity $HC_{fuel}$,
  a fuel cooler heat exchanger for cooling the fuel, the fuel cooler heat exchanger in fluid communication with the cold fuel flowpath, and
  a cold fuel tank disposed along the cold fuel flowpath for accumulating at least a portion of the cooled fuel;

a fuel heating loop including
  a hot fuel flowpath having the fuel flowing therethrough,
  a fuel heater heat exchanger for heating the fuel, the fuel heater heat exchanger in fluid communication with the hot fuel flowpath, and
  a hot fuel tank disposed along the hot fuel flowpath for accumulating at least a portion of the heated fuel,
  wherein the fuel cooling loop is coupled to the fuel heating loop such that the fuel circulates through both the fuel cooling loop and the fuel heating loop;

a heat source providing a flow of a hot fluid having a heating capacity $HC_{heat}$;

a thermal transport flowpath having a thermal transport fluid flowing therethrough, the thermal transport fluid in thermal communication with the hot fluid such that heat flows from the hot fluid to the thermal transport fluid to heat the thermal transport fluid, the thermal transport fluid placing a heating demand $D_{heat}$ on the heat source, the thermal transport flowpath in fluid communication with the fuel heater heat exchanger such that heat flows from the thermal transport fluid to the fuel to heat the fuel; and one or more valves configured to control a flow $F_{Htank}$ of the heated fuel from the fuel heater heat exchanger to the hot fuel tank for accumulation of the heated fuel and a flow $F_{burn}$ of the heated fuel to a fuel burn location such that $F_{Htank}/F_{burn}>1$ when $HC_{heat}>D_{heat}$ and $F_{Htank}/F_{burn}<-0.50$ when $D_{fuel}>HC_{fuel}$.

* * * * *